US012465069B2

(12) United States Patent
Marzec et al.

(10) Patent No.: US 12,465,069 B2
(45) Date of Patent: *Nov. 11, 2025

(54) METHOD FOR PRODUCING A PEA EXTRACT

(71) Applicant: COSUCRA GROUPE WARCOING S.A., Warcoing (BE)

(72) Inventors: Véronique Marzec, Cysoing (FR); Audrey Bourgeois, Lys-lez-Lannoy (FR); Julie Lebesgue, Mouchin (FR); Frédéric Mansy, Hyon (BE); Eric Bosly, Rumillies (BE); Anthony Gramain, Bruille-Saint-Amand (FR); Mary Descamps, Havinnes (BE)

(73) Assignee: COSUCRA GROUPE WARCOING S.A., Warcoing (BE)

( * ) Notice: Subject to any disclaimer, the term of this patent is extended or adjusted under 35 U.S.C. 154(b) by 22 days.

This patent is subject to a terminal disclaimer.

(21) Appl. No.: 18/520,784

(22) Filed: Nov. 28, 2023

(65) Prior Publication Data

US 2024/0090542 A1 Mar. 21, 2024

Related U.S. Application Data

(60) Continuation of application No. 17/829,910, filed on Jun. 1, 2022, now Pat. No. 11,839,226, which is a division of application No. 15/568,040, filed as application No. PCT/EP2016/060579 on May 11, 2016, now Pat. No. 11,375,737.

(30) Foreign Application Priority Data

May 13, 2015 (BE) .................................. 2015/5300

(51) Int. Cl.
| | | |
|---|---|---|
| A23L 13/40 | (2023.01) | |
| A23J 1/14 | (2006.01) | |
| A23J 3/14 | (2006.01) | |
| A23L 11/00 | (2021.01) | |
| A23L 13/50 | (2016.01) | |
| A23L 19/00 | (2016.01) | |
| A23L 29/206 | (2016.01) | |
| A23L 35/00 | (2016.01) | |

(52) U.S. Cl.
CPC ............. *A23L 13/422* (2016.08); *A23J 1/14* (2013.01); *A23J 3/14* (2013.01); *A23L 11/05* (2016.08); *A23L 13/426* (2016.08); *A23L 13/50* (2016.08); *A23L 19/09* (2016.08); *A23L 29/206* (2016.08); *A23L 35/00* (2016.08); *A23V 2002/00* (2013.01)

(58) Field of Classification Search
CPC ........ A23L 13/50; A23L 35/00; A23L 13/426; A23L 29/206; A23L 19/09; A23L 13/422; A23J 1/14
See application file for complete search history.

(56) References Cited

U.S. PATENT DOCUMENTS

| | | |
|---|---|---|
| 4,677,065 A | 6/1987 | Buechbjerg et al. |
| 2004/0091600 A1 | 5/2004 | Salome et al. |
| 2008/0226810 A1 | 9/2008 | Passe et al. |
| 2008/0226811 A1 | 9/2008 | Boursier et al. |
| 2011/0274797 A1 | 11/2011 | Segall et al. |
| 2013/0129901 A1 | 5/2013 | Segall |
| 2014/0134310 A1 | 5/2014 | Nakamura et al. |

FOREIGN PATENT DOCUMENTS

| | | |
|---|---|---|
| EP | 0 251 163 A2 | 1/1988 |
| EP | 1 400 537 A1 | 3/2004 |
| FR | 2 889 416 A1 | 2/2007 |
| FR | 2 889 417 A1 | 2/2007 |
| FR | 2 976 945 A1 | 12/2012 |
| WO | 2015071498 A1 | 5/2015 |

OTHER PUBLICATIONS

Canadian Office Action as Issued on Nov. 23, 2023 in Respect to Counterpart Canadian Patent Application No. 2,982,705 and Its English Translation.
Reichert, Robert D. and Mackenzie, Samuel L. Composition of peas (*Pisum sativum*) varying widely in protein content. Journal of Agricultural and Food Chemistry, 1982, vol. 30, No. 2, pp. 312-317.
PCT International Search Report dated Aug. 8, 2016 for PCT International Patent Application No. PCT/EP2016/060579, 9 pages.
PCT Written Opinion dated Aug. 8, 2016 for PCT International Patent Application No. PCT/EP2016/060579, 7 pages.
Chapter 4: Fermentation of Grain Legumes, Seeds and Nuts in Latin America and the Caribbean ED—Deshpande; S S, Jan. 1, 2000 (Jan. 1, 2000), Fermented Grain Legumes, Seeds and Nuts: A Global Perspective (Book Series: FAO Agricultural Services Buiietin), Food and Agriculture Organization of the United Nations, IT, pp. 99-105, 107-109.
Camacho L et al: "Mejoramieto nutricional de legumbres de consumo habitual fermentado por cultivos del grano Lactobacilus", Alimentos, Santiago, Cl, vol. 16, Jan. 1, 1991 (Jan. 1, 1991), pp. 5-11.

(Continued)

*Primary Examiner* — Vera Stulii
(74) *Attorney, Agent, or Firm* — Amster, Rothstein & Ebenstein LLP

(57) ABSTRACT

The invention relates to a process for preparing a pea extract comprising fibres, the process comprising the following steps: (a) bringing shelled peas into contact with an aqueous solution in order to form an aqueous composition comprising peas; (b) leaving the peas to hydrate in said aqueous composition for at least 30 minutes and at most 15 hours; (c) grinding said peas in order to as a result obtain ground peas; and (d) fractionating said ground peas in order to obtain at least one pea extract comprising fibres. The invention also relates to a pea extract that can be obtained according to the process of the invention. The invention also relates to an edible composition comprising the pea extract according to the invention.

10 Claims, 4 Drawing Sheets

(56) References Cited

OTHER PUBLICATIONS

Schindler Sabrina et al: "Improvement of the Aroma of Pea (*Pi sum sativum*) Protein Extracts by Lactic Acid Fermentation", Food Biotechnology, vol. 26, No. 1, Jan. 1, 2012 (Jan. 1, 2012), pp. 58-74.
Khattab R Y et al: "Nutritional quality of legume seeds as affected by some physical treatments, Part 1: Protein quality evaluation", LWT—Food Science and Technology, vol. 42, No. 6, Jul. 1, 2009 (Jul. 1, 2009), pp. 1107-1112.
Third Party Observations dated Sep. 13, 2017 in connection with PCT International Patent Application No. PCT/EP2016/060579, 17 pages.
Meuser F et al: "Yield of Starch and By-Products in the Processing of Different Varieties of Wrinkled Peas on a Pilot Sale," Cereal Chem., 1997, 74(4):364-370.

METHOD FOR PRODUCING A PEA EXTRACT

CROSS-REFERENCE TO RELATED APPLICATIONS

This application is a continuation of U.S. patent application Ser. No. 17/829,910, filed Jun. 1, 2022, now U.S. Pat. No. 11,839,226 B2, issued Dec. 12, 2023, which is a divisional of U.S. patent application Ser. No. 15/568,040, filed Oct. 20, 2017, now U.S. Pat. No. 11,375,737 B2, issued Jul. 5, 2022, which is a U.S. national stage entry under 35 U.S.C. § 371 of PCT International Patent Application No. PCT/EP2016/060579, filed May 11, 2016, which claims priority to Belgian Patent Application No. 2015/5300, filed May 13, 2015, the contents of which are incorporated herein by reference in their entirety.

FIELD OF THE INVENTION

The present invention relates to processes for separating and purifying the various compounds of the pea. In particular, the present invention relates to the preparation of a pea extract comprising fibres. The invention also relates to a pea extract comprising fibres that can be obtained by means of the abovementioned processes, and also to the products intended for food for human consumption or animal feed containing a pea extract comprising fibres. A subject of the invention is also the use of the pea extract comprising fibres in the human food or animal feed industry.

CONTEXT OF THE INVENTION

The pea is an annual plant species of the family of leguminous plants with rapid growth. Pea plantations are very widespread in Northern Europe. The pea (*Pisum sativum*) has been known for centuries as a healthy vegetable and is part of a balanced diet by virtue of the low amount of lipids and its high protein, starch and fibre content.

The pea fibre is used as a mixture in the meat, fish and vegetarian-product industry as a texturing product or for its dietary fibre properties.

In order to separate the plant fibres from the other pea products, many treatment steps are necessary, such as extraction, fractionation and purification steps. The purity and especially the physicochemical properties of the pea fibre, such as water retention, oil retention, colour, taste, density and gel strength, will vary according to the treatment used. All the manipulations prior to obtaining the pea extract comprising fibres, available in a more or less pure form, have a strong impact on its quality. For example, the pea contains a certain amount of starch. This starch remains more or less linked to the plant fibres according to the process used. The physicochemical properties of the pea extract comprising fibres will depend, inter alia, on this amount of starch present in the extract. Moreover, the solids content will also influence these properties.

There are very few industrial methods describing the separation of pea plant fibres. Since the pea fibre has until now been considered to be a by-product, little research has been carried out on the process. There is a real need to find a process for extracting pea fibres which is innovative and suitable for the extraction of these fibres.

Consequently, one of the objects of the present invention is to overcome or to improve at least one of the disadvantages of the prior art, or to provide a useful alternative.

SUMMARY OF THE INVENTION

According to a first aspect, the present invention relates to a process for preparing a pea extract comprising fibres. The process for preparing a pea extract comprising fibres comprises the following steps:
(a) bringing shelled peas into contact with an aqueous solution in order to form an aqueous composition comprising peas;
(b) leaving the peas to hydrate in said aqueous composition for at least 30 minutes and at most 15 hours;
(c) grinding said peas in order to as a result obtain ground peas;
(d) fractionating said ground peas in order to obtain at least one pea extract comprising fibres.

According to the present invention, the preparation of a pea extract comprising fibres involves hydration of the peas before grinding them. Preferably, the peas are ground in the wet phase. According to one embodiment, after step (b) and before step (c), the peas are strained and then brought into contact with an aqueous solution. According to one embodiment, during or after the grinding, the pea fibres are separated and purified.

According to a second aspect, the present invention relates to a pea extract comprising fibres which can be obtained or is obtained by means of the process according to the first aspect of the invention.

According to a third aspect, the present invention relates to an edible composition preferably intended for food for human consumption or animal feed, comprising a pea extract comprising fibres according to the second aspect of the invention or a pea extract comprising fibres obtained by means of the process according to the first aspect of the invention.

According to a fourth aspect, the present invention relates to the use of the pea extract comprising fibres according to the second aspect of the invention, or of the pea extract comprising fibres obtained by means of the process according to the first aspect of the invention, in products intended for food for human consumption or animal feed, preferably in restructured products which are meat-based, poultry-based, fish-based and/or vegetable products, for instance ham, burgers, meatballs, nuggets and cordon bleu products, pork and/or chicken and/or fish fresh sausages and sausages eaten cold in slices, meat-based and/or fish-based and/or vegetable pâtés.

There are many plant fibres (carrots, wheat, soya, bamboo, etc.), but the pea fibres of the present invention have a unique combination of physicochemical characteristics. Indeed, the present inventors have noted with surprise that hydrating the peas (*Pisum sativum*) before grinding has a beneficial effect on several physicochemical parameters.

When shelled peas are hydrated before being ground according to the process of the invention, the pea extract comprising fibres has a better water retention compared with a water retention measured on a pea extract comprising fibres that was obtained from shelled peas ground while dry and then hydrated.

Furthermore, the hydration time is important. Simply bringing the pea into contact with an aqueous solution is not sufficient to obtain real hydration and to have the abovementioned characteristics.

Moreover, the pea extract comprising fibres that results from the peas that are shelled and then hydrated according to the process of the invention has a better water retention than this same pea extract resulting from peas not shelled before hydration.

The pea extract comprising fibres that is obtained according to the process of the invention also has excellent oil retention and excellent gel strength for applications in products intended for food for human consumption or animal feed, preferably in restructured products which are meat-based, poultry-based, fish-based and/or vegetable products. Indeed, the pea extract comprising fibres is highly functional and profitable. It helps to reduce losses upon cooking and to improve the yields of various meat-based preparations. It improves the forming texture of restructured products such as hamburgers or nuggets, while at the same time giving the final product greater juiciness. It is neutral in colour and in taste, it has no principal allergen and it can be a functional alternative to proteins.

The independent and dependent claims define the specific and preferred features of the invention. The features of the dependent claims can be combined with the features of the independent claims or with other dependent claims as appropriate. The attached claims are also explicitly included by way of reference in the present description.

DETAILED DESCRIPTION OF THE INVENTION

Figure 1:
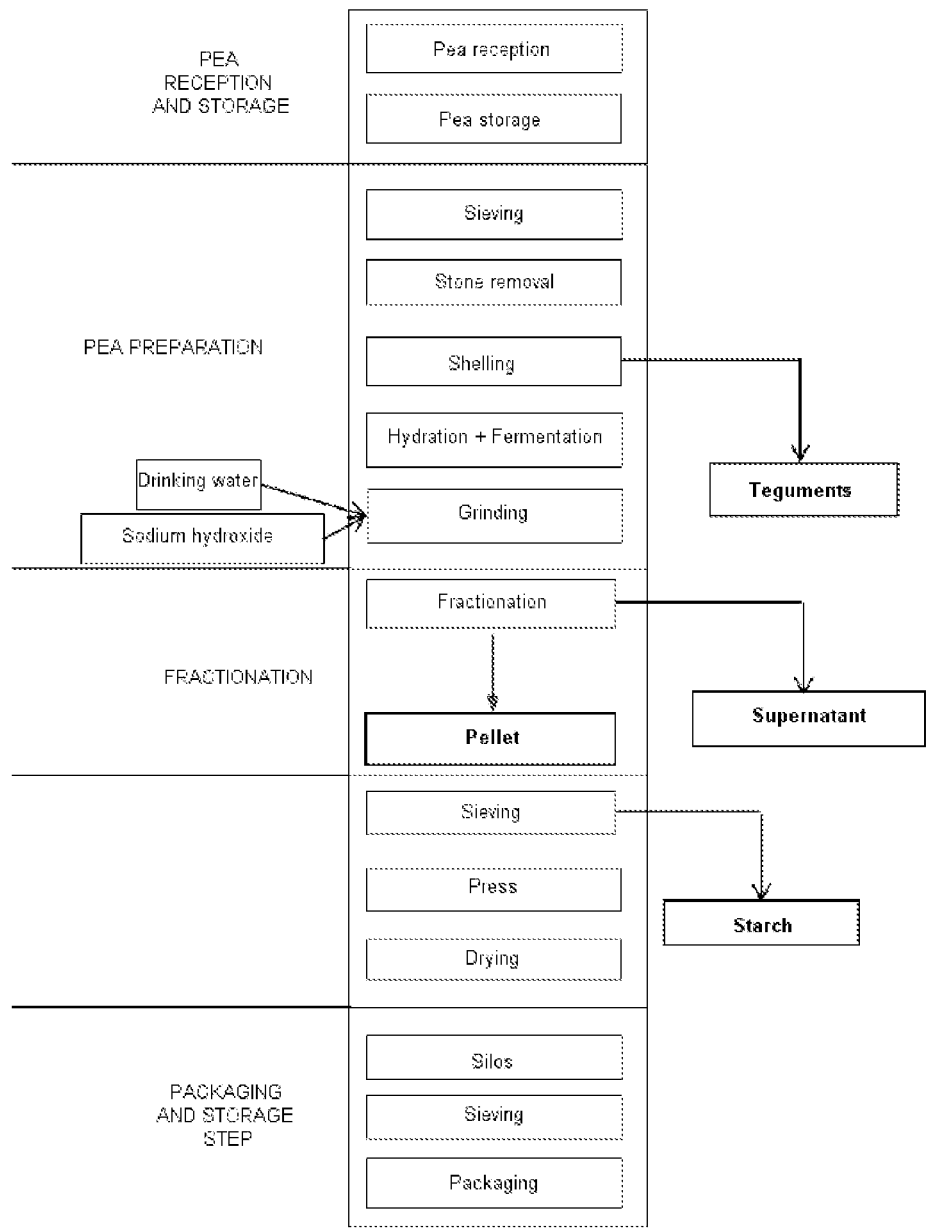
FIG. 1 represents diagrammatically an extraction process according to one embodiment of the invention.

Before describing the process of the present invention, it should be understood that this invention is not limited to the particular processes, components, products or combinations described, it being possible of course for these processes, components, products or combinations to vary. It is also understood that the terminology used herein cannot be considered to be restrictive, given that the field of application of the present invention will be limited only by the appended claims.

As used herein, the singular forms "a", "an" and "the" include singular and plural references unless the context clearly indicates the contrary.

The terms "comprising", "comprises" and "composed of" as used herein are synonymous with "including", "includes" or "containing", "contains", and are inclusive or open and do not exclude the additional process members, elements or steps not mentioned. It should not be forgotten that the terms "comprising", "comprises" and "composed of" as used herein comprise the terms "consisting of", "consists in" and "consists of", and also the terms "consisting essentially of", "consists essentially in" and "consists essentially of".

The mentioning of numerical value ranges by their extreme points includes all the numbers and fractions integrated in the respective ranges, and also the extreme points stated.

The term "about" or "approximately" as used herein when applied to a measurable value such as a parameter, an amount, a time period, and the like, means that there is a degree of variation of ±20% or less, preferably of ±10% or less, more preferentially of ±5% or less, and even more preferentially of ±1% or less with respect to the value specified, insofar as these variations are appropriate for carrying out the present invention. It is understood that the value to which the qualifier "about" or "approximately" makes reference is itself also specifically and preferably described.

Although the term "one or more" or "at least one", such as one or more or at least one member(s) of a group of members, is clear as such, by means of a demonstration by example, the term includes inter alia a reference to any one of said members, or to at least any two of said members, for instance ≥3, ≥4, ≥5, ≥6 or ≥7, etc. of said members, and up to all said members.

All the references cited in the present description are incorporated herein by way of reference in their entirety. In particular, the teachings of all the references mentioned expressly herein are incorporated by way of reference.

Unless otherwise defined, all the terms used in the description of the invention, including the technical and scientific terms, have the meaning commonly understood by any person skilled in the art to which the invention belongs. As additional information, definitions of the terms are included in order to understand more clearly the teaching of the present invention.

Various aspects of the invention are defined in greater detail in the following paragraphs. Each aspect thus defined can be combined with any other aspect(s) unless clearly otherwise indicated. In particular, any characteristic indicated as being preferred or advantageous can be combined with another or other characteristic(s) indicated as being preferred or advantageous.

Any reference in this description to "an embodiment" means that a particular function, structure or characteristic described relative to the embodiment is included in least one embodiment of the present invention. Thus, the occurrences of the phrase "in one embodiment" in various places in this description do not necessarily all refer to the same embodiment, but may do so. Moreover, the particular functions, structures or characteristics can be combined in any appropriate manner, as would appear obvious to those skilled in the art on reading this description, in one or more embodiments. Moreover, although some embodiments described herein comprise some but not other characteristics included in other embodiments, the combinations of characteristics of the various embodiments are part of the field of application of the invention, and form various embodiments, as would be understood by those skilled in the art. For example, in the attached claims, any one of the embodiments claimed can be used in any combination.

In the following detailed description of the invention, reference is made to the appended figures which are an integral part of the invention, and in which the specific embodiments in which the invention can be carried out are represented by way of illustration only. It is understood that other embodiments can be used and structural or logical modifications can be introduced without departing from the field of application of the present invention. The following detailed description should not therefore be considered to be limiting, and the field of application of the 15 present invention is defined by the attached claims.

The present invention is represented in particular by any one or any combination of one or more of the aspects and embodiments below and the indications numbered from 1 to 84.

1. A process for preparing a pea extract comprising fibres, the process comprising the following steps:
    (a) bringing shelled peas into contact with an aqueous solution in order to form an aqueous composition comprising peas;

(b) leaving the peas to hydrate in said aqueous composition for at least 30 minutes and at most 15 hours;
(c) grinding said peas in order to as a result obtain ground peas; and
(d) fractionating said ground peas in order to obtain at least one pea extract comprising fibres.

2. The process according to indication 1, in which step (a) precedes step (b), which itself precedes step (c), which itself precedes step (d).

3. The process according to indication 1 or 2, in which at least one step of drying (e) said pea extract comprising fibres is carried out.

4. The process according to any one of indications 1 to 3, in which the fractionation of said ground peas in step (d) comprises subjecting said ground peas to at least one step of separation by centrifugation and/or filtration.

5. The process according to any one of indications 1 to 4, in which the fractionation step (d) can be divided into at least two fractionation steps (d1) and (d2).

6. The process according to any one of indications 1 to 5, in which the fractionation step (d) comprises at least one step (d1), in which the fractionation of said ground peas in step (d1) comprises subjecting said ground peas to at least one step of settling out, of filtration and/or of separation by centrifugation in order to obtain a fibre-enriched fraction.

7. The process according to any one of indications 1 to 6, in which the fractionation step (d) can be divided into at least two fractionation steps (d1) and (d2), and the fractionation step (d2) comprises at least one step of filtration of the fibre-enriched fraction obtained in step (d1), more particularly a sieving step in order to obtain a pea extract comprising fibres.

8. The process according to any one of indications 1 to 7, in which, during step (b), the peas in said aqueous composition are hydrated for at least 1 hour, preferably for at least 1.5 hours, preferably for at least 3 hours, even more preferentially for at least 6 hours.

9. The process according to any one of indications 1 to 8, in which, during step (b), the peas in said aqueous composition are hydrated at a temperature of at least 0° C.

10. The process according to any one of indications 1 to 9, in which said aqueous composition comprising the peas during step (b) is subjected to at least one fermentation.

11. The process according to any one of indications 1 to 10, in which the fractionation step (d) comprises at least one step (d1), in which the fractionation of said ground peas in step (d1) comprises the adjustment of the pH of the ground peas to a pH of at least 6.

12. The pea extract comprising fibres which can be obtained by means of the process according to any one of indications 1 to 11.

13. The pea extract comprising fibres which can be obtained by means of the process according to any one of indications 3 to 11.

14. Pea extract comprising fibres, characterized in that it comprises:
a fibres/starch weight ratio of at least 30/70 and of at most 85/15, preferentially a pea fibres/starch weight ratio of at least 40/60 and of at most 70/30;
an amount of fibres of at least 35% and of at most 80% by weight on the basis of the solids, assayed by the AOAC-985.29 method, preferentially an amount of fibres of at least 40% and of at most 55% by weight on the basis of the solids, assayed by the AOAC-985.29 method;
a solids content of at least 80% and of at most 95% on the basis of the total weight of the extract, preferably a solids content of at least 86% and of at most 94% on the basis of the total weight of the extract, more preferentially of at least 88% and of at most 92% on the basis of the total weight of the extract; and
a protein content of less than 5% on the basis of the solids; and
in that it has a water retention of at least 9 g of water/g of solids and of at most 19 g of water/g of solids; preferentially a water retention of at least 9 g of water/g of solids and of at most 17 g of water/g of solids; and more preferentially a water retention of at least 9 g of water/g of solids and of at most 15 g of water/g of solids, and even more preferentially a water retention of at least 9 g of water/g of solids and of at most 13 g of water/g of solids.

15. Pea extract comprising fibres according to indication 14, characterized in that it comprises:
a particle size D50<400 μm, measured by dry particle size analysis;
a particle size D90<700 μm, measured by dry particle size analysis; and in that it has
an oil retention of at least 2.5 g of oil/g of solids and of at most 5.0 g of oil/g of solids, preferentially an oil retention of at least 2.8 g of oil/g of solids and of at most 3.2 g of oil/g of solids; and
a gel strength after heat treatment of at least 400 g and of at most 900 g, preferentially a gel strength after heat treatment of at least 400 and of at most 600 g.

16. Ground pea extract comprising fibres, characterized in that it comprises:
a particle size D50<200 μm, measured by dry particle size analysis;
a particle size D90<400 μm, measured by dry particle size analysis;
a fibres/starch weight ratio of at least 30/70 and of at most 85/15, preferentially a fibres/starch weight ratio of at least 40/60 and of at most 70/30;
an amount of fibres of at least 35% and of at most 80% by weight on the basis of the solids, assayed by the AOAC-985.29 method, preferentially an amount of fibres of at least 40% and of at most 65% by weight on the basis of the solids, assayed by the AOAC-985.29 method;
a solids content of at least 80% and of at most 95% on the basis of the total weight of the extract; preferentially a solids content of at least 86% and of at most 94% on the basis of the total weight of the extract, more preferentially of at least 88% and of at most 92% on the basis of the total weight of the extract; and
in that it has a water retention of at least 7 g of water/g of solids and of at most 17 g of water/g of solids, preferentially a water retention of at least 7 g of water/g of solids and of at most 15 g of water/g of solids, more preferentially a water retention of at least 7 g of water/g of solids and of at most 13 g of water/g of solids, even more preferentially a water retention of at least 7 g of water/g of solids and of at most 11 g of water/g of solids, even more preferentially a water retention of at least 9 g of water/g of solids and of at most 11 g of water/g of solids.

17. Ground pea extract comprising fibres according to indication 16, characterized in that it comprises
a protein content of less than 5% on the basis of the solids;
and that it has an oil retention of at least 1.5 g of oil/g of solids and of at most 5.0 g of oil/g of solids, preferentially an oil retention of at least 2.0 g of oil/g of solids and of at most 3.0 g of oil/g of solids; and a gel strength after heat treatment of at least 250 g and of at most 900 g, preferentially a gel strength after heat treatment of at least 300 and of at most 400 g.

18. An edible composition, preferably a product intended for food for human consumption or animal feed, comprising the pea extract comprising fibres according to any one of indications 12 to 17.

19. The use of the pea extract comprising fibres according to any one of indications 12 to 17, in products intended for food for human consumption or animal feed, preferably restructured products which are meat-based, poultry-based, fish-based or vegetable products, pork and/or chicken and/or fish fresh sausages and sausages eaten cold in slices, meat/fish-based or vegetarian pâtés.

20. The process according to any one of indications 1 to 11, in which said aqueous solution of step (a) is water.

21. The process according to any one of indications 1 to 11 and 20, in which the peas of step (a) are dry peas, preferably peas having a solids content of at least 80% and of at most 95% on the basis of the total weight of the dry peas.

22. The process according to any one of indications 1 to 11 and 20 to 21, in which the amount of peas that is added to the aqueous solution in step (a) in order to reconstitute the aqueous composition comprising peas is at least 150 and at most 500 kg of peas per m$^3$ of aqueous composition comprising peas.

23. The process according to any one of indications 1 to 11 and 20 to 22, in which step (b) comprises the fermentation of said peas in the presence of lactic acid bacteria, preferably in the presence of one or more species of lactobacilli.

24. The process according to any one of indications 1 to 11 and 20 to 23, in which step (b) comprises the fermentation of said peas in the presence of lactic acid bacteria, in which said lactic acid bacteria are chosen from the group comprising: *Lactobacillus, Leuconostoc, Pediococcus, Streptococcus, Aerococcus, Carnobacterium, Enterococcus, Oenococcus, Sporolactobacillus, Tetragenococcus, Vagococcus* and *Weisella*, and combinations thereof.

25. The process according to any one of indications 1 to 11 and 20 to 24, in which step (b) comprises the fermentation of said peas in the presence of lactic acid bacteria chosen from the group comprising: *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii* and *Lactobacillus casei*, and mixtures thereof.

26. The process according to any one of indications 1 to 11 and 20 to 25, in which step (b) comprises the fermentation of said peas in the presence of lactic acid bacteria, in which the lactic acid bacteria are chosen from the group comprising: *Lactobacillus fermentum, Lactobacillus crispatus, Lactobacillus panis, Lactobacillus mucosae, Lactobacillus pontis*, and mixtures thereof.

27. The process according to any one of indications 1 to 11 and 20 to 26, in which step (b) comprises the fermentation of said peas in the presence of lactic acid bacteria, in which said lactic acid bacteria are *Lactobacillus fermentum* or *Lactobacillus crispatus*.

28. The process according to any one of indications 1 to 11 and 20 to 27, in which step (b) comprises the fermentation of said peas, in which said fermentation is an anaerobic fermentation.

29. The process according to any one of indications 1 to 11 and 20 to 28, in which said peas of step (b) are subjected to a fermentation until the pH of said peas is at most 5.5, preferably at most 5.0, preferentially until the pH of said peas is at least pH 3.5 and at most pH 5, measured at ambient temperature on 1 g of said peas which have been ground and then suspended in 9 g of water.

30. The process according to any one of indications 1 to 11 and 20 to 29, in which said peas of step (b) are subjected to a fermentation until the pH of said peas is reduced by at least 1 pH unit, preferably by at least 1.5 pH unit, measured at ambient temperature on 1 g of said peas which have been ground and then suspended in 9 g of water.

31. The process according to any one of indications 1 to 11 and 20 to 30, in which said peas of step (b) are subjected to a fermentation in the presence of at least $10^2$ cfu to at most $10^{10}$ cfu of lactic acid bacteria per ml of said aqueous composition comprising peas.

32. The process according to any one of indications 1 to 11 and 20 to 31, in which, at the end of step (b), said peas have an acidity of at least 25 and of at most 250 mEq OH$^-$ per gramme of peas.

33. The process according to any one of indications 1 to 11 and 20 to 32, in which the grinding in step (c) is carried out wet.

34. The process according to any one of indications 1 to 11 and 20 to 33, in which, after step (b) and before step (c), the peas are strained and then brought into contact with an aqueous solution.

35. The process according to indication 34, in which said aqueous solution is water.

36. The process according to any one of indications 1 to 11 and 20 to 35, in which said peas after step (b) and before step (c) have a solids content of at least 35% and of at most 70% on the basis of the total weight of the peas, preferably of at least 40% and of at most 50%.

37. The process according to any one of indications 1 to 11 and 20 to 36, in which, before, during and/or after the grinding step (c), an aqueous solution is added, preferably water, preferably so as to obtain an aqueous composition comprising ground peas, said composition comprising at least 15% and at most 35% of solids on the basis of the total weight of the composition, preferably from 15% to 35% of solids on the basis of the total weight of the composition, from 18% to 33%, for example from 20% to 30% of solids on the basis of the total weight of the composition, for instance at least 21%, for example at least 22%, for example at least 23%, for example at least 24%, for example at least 25%, at least 26%, at least 27%, at least 28%, at least 29% of solids on the basis of the total weight of the composition, for example at most 30% of solids on the basis of the total weight of the composition, at most 31%, at most 32%, at most 33%, at most 34% of solids on the basis of the total weight of the composition.

38. The process according to any one of indications 1 to 11 and 20 to 37, in which the fractionation step (d) comprises at least one step (d1), in which the fractionation of said ground peas in step (d1) comprises the adjustment of the pH of the ground peas to a pH of at least 6, preferably of at least 7, preferably to a pH of at least 8 and of at most 9. This adjustment of the pH can be carried out during the grinding step (c). This adjustment of the pH can be carried out using any appropriate base, such as sodium hydroxide, potassium hydroxide or calcium hydroxide. Preferably, this adjustment of the pH is carried out on an aqueous composition comprising ground peas having a solids content of at most 45%, preferably of at most 40%, preferably of at most 35%, preferably of at most 30%, preferably of at most 25%. In one embodiment, the solids content of the ground peas is adjusted to the abovementioned solids content by adding water accordingly.

39. The process according to any one of indications 1 to 11 and 20 to 38, in which the fractionation step (d) comprises at least one step (d1), in which the fractionation of said ground peas in step (d1) comprises the step of subjecting said ground peas to at least one settling out step, preferably at least one step of settling out by centrifugation, in which the settling out pellets comprise a fibre-enriched fraction.

40. The process according to any one of indications 1 to 11 and 20 to 38, in which the fractionation step (d) comprises at least one step of subjecting said ground peas to at least one filtration step, in which the cake comprises a pea extract comprising fibres.

41. The process according to any one of indications 1 to 11 and 20 to 38, in which the fractionation step (d) comprises at least one step (d1), in which the fractionation of said ground peas in step (d1) comprises the step of subjecting said ground peas to at least one step of separation by hydrocyclones, in which the underflow comprises a fibre-enriched fraction.

42. The process according to any one of indications 1 to 11 and 20 to 39, in which the fractionation step (d) comprises at least one step (d1), in which the fractionation of said ground peas in step (d1) comprises the step of subjecting said ground peas to at least one settling out step, preferably to at least one step of settling out by centrifugation in order to obtain pellets, and the subjecting of these pellets obtained to at least one filtration step (d2).

43. The process according to any one of indications 1 to 11 and 20 to 42, in which the fractionation step (d) comprises at least one step (d1), in which the fractionation of said ground peas in step (d1) comprises the step of subjecting said ground peas to at least one step of separation by hydrocyclones, in order to obtain underflows, and the subjecting of these underflows to at least one step of settling out by centrifugation (d2).

44. The process according to any one of indications 1 to 11 and 20 to 43, in which the fractionation step (d) comprises at least one step (d1), in which the fibre-enriched fraction obtained in step (d1) also comprises pea starch.

45. The process according to any one of indications 1 to 11 and 20 to 44, in which the fractionation step (d) comprises at least one step (d1), in which the fibre-enriched fraction obtained in step (d1) comprises a solids content of at least 35% and of at most 55% on the basis of the total weight of the fraction, preferentially of at least 40% and of at most 50% on the basis of the total weight of the fraction.

46. The process according to any one of indications 1 to 11 and 20 to 45, in which the fractionation step (d) comprises at least one step (d1), in which the fibre-enriched fraction obtained in step (d1) comprises, on the basis of the solids, at least 50% of starch, by weight, and at most 90% of starch, by weight, preferentially at least 60% and at most 80%, by weight, on the basis of the solids.

47. The process according to any one of indications 1 to 11 and 20 to 46, in which the fractionation step (d) can be divided into at least two fractionation steps (d1) and (d2), and step (d2) comprises subjecting said fibre-enriched fraction to at least one separation step, followed by at least one concentration step, preferentially a step of concentration by passing through a press or through a decanter, more preferentially a step of concentration by passing through a press.

48. The process according to any one of indications 1 to 11 and 20 to 47, in which the fibres contained in the pea extract comprising fibres comprise pectin.

49. The process according to any one of indications 1 to 11 and 20 to 48, in which the fibres contained in the pea extract comprising fibres comprise hemicellulose.

50. The process according to any one of indications 1 to 11 and 20 to 49, in which the fibres contained in the pea extract comprising fibres comprise cellulose.

51. The process according to any one of indications 1 to 11 and 20 to 50, in which the fibres contained in the pea extract comprising fibres comprise lignin.

52. The process according to any one of indications 1 to 11 and 20 to 51, in which 90% of the particles of the pea extract comprising fibres have a size<700 µm, measured by wet particle size analysis.

53. The process according to any one of indications 1 to 11 and 20 to 52, in which 50% of the particles of the pea extract comprising fibres have a size<450 µm, measured by wet particle size analysis.

54. The process according to any one of indications 1 to 11 and 20 to 53, in which the pea extract comprising fibres comprises, on the basis of the solids, at least 10% of starch, by weight, and at most 60% of starch, by weight, preferentially at least 20% and at most 50% of starch, by weight, on the basis of the solids.

55. The process according to any one of indications 1 to 11 and 20 to 54, in which the pea extract comprising fibres has a fibres/starch weight ratio of at least 30/70 and of at most 85/15, preferentially a fibres/starch weight ratio of at least 40/60 and of at most 70/30.

56. The process according to any one of indications 1 to 11 and 20 to 55, in which the pea extract comprising fibres has a water retention of at least 5 g of water/g of solids and of at most 21 g of water/g of solids, preferentially of at least 7 g of water/g of solids and of at most 17 g of water/g of solids, more preferentially of at least 9 g of water/g of solids and of at most 15 g of water/g of solids.

57. The process according to any one of indications 1 to 11 and 20 to 56, in which the pea extract comprising fibres has a protein content of less than 5% on the basis of the solids.

58. The process according to any one of indications 3 to 11 and 20 to 57, in which at least one step of drying (e) said pea extract comprising fibres is carried out, said at least one drying step being carried out on a drier by entrainment, preferably on a flash drier, on a whirl flash drier and/or on a fluidized air bed drier.

59. The process according to any one of indications 3 to 11 and 20 to 58, in which at least one step of drying (e) said pea extract comprising fibres is carried out, and in which said pea extract comprising fibres that is obtained after the drying step (e) has a solids content of at most 95% on the basis of the total weight of the composition and at least 80%.

60. The process according to any one of indications 3 to 11 and 20 to 59, in which at least one step of drying (e) said pea extract comprising fibres is carried out, and in which said pea extract comprising fibres that is obtained after the drying step (e) comprises, on the basis of the solids, at most 90% of fibres, by weight, preferentially at most 80% of fibres, by weight, assayed by the AOAC-985.29 method, and at least 35% of fibres, by weight, more preferentially at least 40% of fibres, by weight, assayed by the AOAC-985.29 method.

61. The process according to any one of indications 1 to 11 and 20 to 60, in which at least one step of drying (e) said pea extract comprising fibres is carried out, and in which the pea extract comprising fibres that is obtained after the drying step (e) comprises, on the basis of the solids, at least 10% of starch, by weight, and at most 60% of starch, by weight, preferentially at least 20% and at most 50%, by weight, on the basis of the solids.

62. The process according to any one of indications 3 to 11 and 20 to 61, in which at least one step of drying (e) said pea extract comprising fibres is carried out, and in which the pea extract comprising fibres that is obtained after the drying step (e) has a fibres/starch weight ratio of at least 40/60 and of at most 85/15, preferentially has a fibres/starch weight ratio of at least 50/50 and of at most 70/30.

63. The process according to any one of indications 3 to 11 and 20 to 62, in which at least one step of drying (e) said pea extract comprising fibres is carried out, and in which 50% of the particles of the pea extract comprising fibres that is obtained after the drying step (e) have a size<400 µm, measured by dry particle size analysis, preferably a size<300 µm, measured by dry particle size analysis.

64. The process according to any one of indications 3 to 11 and 20 to 63, in which at least one step of drying (e) said pea extract comprising fibres is carried out, in which 90% of the particles of the pea extract comprising fibres that is obtained after the drying step (e) have a size<700 µm, measured by dry particle size analysis, preferably a size<600 µm, measured by dry particle size analysis, even more preferentially a size<500 µm, measured by dry particle size analysis.

65. The process according to any one of indications 3 to 11 and 20 to 64, in which at least one step of drying (e) said pea extract comprising fibres is carried out, and in which said pea extract comprising fibres that is obtained after the drying step (e) has a water retention of at least 5 g of water/g of solids and of at most 20 g of water/g of solids, preferentially of at least 6 g of water/g of solids and of at most 16 g of water/g of solids, more preferentially of at least 8 g of water/g of solids and of at most 14 g of water/g of solids.

66. The process according to any one of indications 3 to 11 and 20 to 65, in which at least one step of drying (e) said pea extract comprising fibres is carried out, and in which the pea extract comprising fibres that is obtained after the drying step (e) has an oil retention of at least 2.5 g of oil/g of solids and of at most 5.0 g of oil/g of solids, preferentially of at least 2.7 g of oil/g of solids and of at most 3.4 g of oil/g of solids.

67. The process according to any one of indications 3 to 11 and 20 to 66, in which at least one step of drying (e) said pea extract comprising fibres is carried out, and in which the pea extract comprising fibres that is obtained after the drying step (e) has a gel strength after heat treatment of at least 400 g and of at most 900 g, preferentially of at least 450 g and of at most 500 g.

68. The process according to any one of indications 3 to 11 and 20 to 67, in which at least one step of drying (e) said pea extract comprising fibres is carried out, and in which the pea extract comprising fibres that is obtained after the drying step (e) has a protein content of less than 5% on the basis of the solids.

69. The process according to any one of indications 1 to 11 and 20 to 68, in which a second grinding can take place after step (d), more preferentially after step (e).

70. The process according to indication 68, in which the pea extract comprising fibres comprises, on the basis of the solids, at least 35% and at most 90% of fibres, by weight, preferentially at least 40% and at most 80% of fibres, by weight, assayed by the AOAC-985.29 method.

71. The process according to either one of indications 69 and 70, in which the pea extract comprising fibres has a fibres/starch weight ratio of at least 40/60 and of at most 85/15, preferentially a fibres/starch weight ratio of at least 50/50 and of at most 70/30.

72. The process according to any one of indications 69 to 71, in which the pea extract comprising fibres comprises, on the basis of the solids, at least 10% of starch, by weight, and at most 60% of starch, by weight, preferentially at least 20% and at most 50%, by weight, on the basis of the solids.

73. The process according to any one of indications 69 to 72, in which 50% of the particles of the pea extract comprising fibres have a size<200 µm, measured by dry particle size analysis, preferably a size<100 µm, measured by dry particle size analysis.

74. The process according to any one of indications 69 to 73, in which 90% of the particles of the pea extract comprising fibres have a size<400 µm, measured by dry particle size analysis, preferably a size<300 µm, measured by dry particle size analysis.

75. The process according to any one of indications 69 to 74, in which said pea extract comprising fibres has a water retention of at least 5 g of water/g of solids and of at most 20 g of water/g of solids, preferentially of at least 5 g of water/g of solids and of at most 17 g of water/g of solids, more preferentially of at least 6 g of water/g of solids and of at most 15 g of water/g of solids.

76. The process according to any one of indications 69 to 75, in which the pea extract comprising fibres has an oil retention of at least 1.5 g of oil/g of solids and of at most 5.0 g of oil/g of solids, preferentially of at least 2.0 g of oil/g of solids and of at most 2.5 g of oil/g of solids.

77. The process according to any one of indications 69 to 76, in which the pea extract comprising fibres has a gel strength after heat treatment of at least 250 g and of at most 900 g, preferentially of at least 300 g and of at most 500 g.

78. The process according to any one of indications 69 to 77, in which the pea extract comprising fibres has a protein content of less than 5% on the basis of the solids.

79. The process according to any one of indications 1 to 11 and 20 to 78, comprising the following steps:
    (a) bringing the shelled peas into contact with an aqueous solution in order to form an aqueous composition comprising peas;
    (b) leaving the peas to hydrate in said aqueous composition for at least 30 minutes and at most 15 hours;
    (c) grinding said peas in order to as a result obtain ground peas;
    (d1) fractionating said ground peas in order to obtain at least one fibre-enriched fraction; and
    (d2) fractionating said fibre-enriched fraction in order to obtain a pea extract comprising fibres.

80. The process according to any one of indications 1 to 11 and 20 to 79, comprising the following steps:
    (a) bringing the shelled peas into contact with an aqueous solution in order to form an aqueous composition comprising peas;
    (b) leaving the peas to hydrate in said aqueous composition for at least 30 minutes and at most 15 hours;
    (c) grinding said peas in order to as a result obtain ground peas;
    (d) fractionating said ground peas in order to obtain at least one pea extract comprising fibres; and
    (e) drying said pea extract comprising fibres, optionally grinding said pea extract before or after step (e).

81. The process according to any one of indications 1 to 11 and 20 to 80, comprising the following steps:
- (a) bringing the shelled peas into contact with an aqueous solution in order to form an aqueous composition comprising peas;
- (b) leaving the peas to hydrate in said aqueous composition for at least 30 minutes and at most 15 hours;
- (c) grinding said peas in order to as a result obtain ground peas;
- (d1) fractionating said ground peas in order to obtain at least one fibre-enriched fraction;
- (d2) fractionating said fibre-enriched fraction in order to obtain a pea extract comprising fibres; and
- (e) drying said pea extract comprising fibres, optionally grinding said pea extract before or after step (e).

82. The process according to any one of indications 1 to 11 and 20 to 81, comprising the following steps:
- (a) bringing the shelled peas into contact with an aqueous solution in order to form an aqueous composition comprising peas;
- (b) leaving the peas to hydrate in said aqueous composition for at least 3 hours and at most 8 hours;
- (c) grinding said peas in order to as a result obtain ground peas;
- (d1) fractionating said ground peas in order to obtain at least one fibre-enriched fraction;
- (d2) fractionating said fibre-enriched fraction in order to obtain a pea extract comprising fibres; and
- (e) drying said pea extract comprising fibres, optionally grinding said pea extract before or after step (e).

83. The process according to any one of indications 20 to 82, in which the water may be tap water, well water or demineralized water.

84. The pea extract comprising fibres that can be obtained by means of the process according to any one of indications 1 to 11 and 20 to 83.

As used herein, the term "pea" refers to the round seeds contained in the pod of *Pisum sativum* (wrinkled pea or smooth pea) and its subspecies, varieties or cultivars. Preferably, the peas are yellow peas, preferably dry yellow peas, i.e. yellow peas which have been harvested in the dry state. The term "fibres", more specifically "pea internal fibres" or "cotyledon" or "cell wall fibres" as used herein consequently refer mainly to the fibres contained in the shelled pea seeds.

According to one preferred embodiment, the pea fibres contain principally pectin, lignin, cellulose and hemicellulose.

According to the invention, the peas are shelled peas, i.e. peas such as they are present in the pod, but the external tegument or shell of which has been removed. The removal of the tegument can be carried out by techniques known in the art, for instance mechanically using shelling machines. It is understood that, when reference is made herein to shelled peas, in some embodiments, not all but nevertheless the vast majority of the individual peas are shelled, preferably more than 50% of the peas, more preferentially more than 60%, more preferentially more than 70%, even more preferentially more than 80%, even more preferentially more than 90% of the peas are shelled.

The peas, as used herein, may be sorted before being subjected to hydration. For example, stones or plant matter of large size, but also damaged peas, can be removed from the peas intended to be used according to the invention.

As used herein, the expression "preparation of a pea extract comprising fibres" refers to purifying and separating the fibres from certain other pea components.

Those skilled in the art will understand that the pea extract comprising fibres will comprise mainly fibres but also pea starch, and also a certain amount of additional components (impurities) may be present, such as lipids, proteins, minerals, etc.

According to the invention, steps (a) to (d) of the process specified above are preferably carried out in the following order: step (a) precedes step (b), which itself precedes step (c), which itself precedes step (d). However, it is also possible according to the invention to carry out steps (c) and (d) simultaneously, i.e. the grinding step and the fractionation step are carried out simultaneously.

According to step (a) of the process described herein, shelled peas are brought into contact with an aqueous solution in order to form an aqueous composition comprising peas. According to the invention, the peas which are used in step (a) are non-ground peas (i.e. whole peas). The peas may, however, in one embodiment, be split peas. In one embodiment, the peas are round at harvesting and after drying. After having removed the tegument, the natural pieces of seed cotyledons can be separated manually or mechanically, to give "split peas".

As used herein, the expression "aqueous composition comprising peas" used in step (a) refers to a composition mainly comprising or exclusively consisting of an aqueous solution such as water, in addition to the peas. In some embodiments, the aqueous composition comprises for example a suspension of peas in an aqueous solution. In one preferred embodiment, the aqueous solution is water. In one embodiment, the water may be tap water, well water or demineralized water. The water used is preferably drinking water, i.e. water suitable for human consumption.

In certain embodiments, the amount of peas that is added to the aqueous solution in order to reconstitute the aqueous composition comprising peas is preferably between 150 and 500 kg of peas per $m^3$ of aqueous composition comprising peas, i.e. for 150 to 500 kg of peas, an aqueous solution is added until a final volume of 1 $m^3$ is obtained.

In one embodiment, the aqueous composition comprising peas in step (a) of the process described herein has a pH of at least 6, preferably of at least 6.2, for example at least 6.4, measured on the aqueous composition comprising peas.

In one preferred embodiment, the shelled peas which are in contact with the aqueous composition are harvested naturally dry, or in one embodiment, the peas may be peas that are dried after harvesting at maturity. Preferably, the peas are shelled dry peas, and have a solids content (by weight) of at least 80% (i.e. at least 80 g of solids for a total weight of 100 g of peas), more preferentially of at least 85%, for example of at least 90%, for example of at least 95%, for instance a solids content of between 80% and 95%, for example between 85% and 95%, for example between 90% and 95%.

According to step (b) of the process described herein, the peas of the aqueous composition are subjected to hydration for at least 30 minutes and at most 15 hours. In one embodiment, the peas of the aqueous composition are subjected to hydration in step (b) of the process described for a period of at least 1 hour, preferably of at least 2 hours, preferably of at least 3 hours, for example of at least 4 hours, for example of at least 5 hours, more preferentially of at least 6 hours, of about 7 hours, of about 8 hours, of about 9 hours, for example of at most 10 hours, for example of at most 11 hours, for example of at most 12 hours, for example of at most 13 hours, for example of at most 14 hours, for example of at most 15 hours. In another embodiment, the peas of the aqueous composition are subjected to hydration in step (b)

of the process described for a period of between 30 minutes and 14 hours, preferably between 1 hour and 14 hours, more preferentially between 1 hour and 12 hours, even more preferentially between 3 h and 9 h.

In one preferred embodiment, said peas in step (b) are subjected to a step of hydration at a temperature of at least 0° C., of at least 5° C., of at least 10° C., of at least 15° C., of at least 17° C., of at least 20° C., of at least ambient temperature, of at least 25° C., of at least 30° C., of at least 35° C., of at least 40° C., of at least 45° C. In one embodiment, said peas are subjected to a step of hydration at a temperature of at most 5° C., of at most 10° C., of at most 15° C., of at most 17° C., of at most 20° C., of at most ambient temperature, of at most 25° C., of at most 30° C., of at most 35° C., of at most 40° C., of at most 45° C., of at most 50° C. In one embodiment, said peas are subjected to a step of hydration at a temperature of between 0° C. and 50° C., between 0° C. and 30° C., more preferentially of between 5° C. and 25° C., even more preferentially between 20° C. and 25° C.

In one embodiment, at the beginning of or during the hydration step, a fermentation can be carried out. As used herein, the term "fermentation" has the meaning commonly accepted in the art. As additional information, it can be specified that fermentation is a microbiological metabolic process comprising the conversion of sugars to acids, and/or to gas, using yeasts and/or bacteria. According to one embodiment, the subjecting of an aqueous composition comprising peas to a fermentation, as used herein, can consequently refer to the incubating of the aqueous composition comprising peas with bacteria and/or yeasts under conditions suitable for the bacteria and/or the yeasts to be metabolically active.

In one embodiment, the aqueous composition comprising peas is subjected to a fermentation in step (b) of the process described above with lactic acid bacteria. As used herein, the expression "lactic acid bacteria" refers to a population of cocci or of bacilli which are gram-positive, have a low guanine+cytosine content, are tolerant to acids, are generally non-sporulated, are anaerobic and are linked by their common metabolic and physiological characteristics and produce lactic acid as main final metabolic product of carbohydrate fermentation. These bacteria can generally be present in decomposing plants and milk products. As used herein, the lactic acid bacteria may be non-pathogenic in the sense that they do not cause damage or do not result in harmful effects if they are ingested. Preferably, the lactic acid bacteria, as used herein, are one or more bacterial genus or genera chosen from the group comprising *Lactobacillus, Pediococcus, Lactococcus, Leuconostoc, Streptococcus, Aerococcus, Carnobacterium, Enterococcus, Oenococcus, Sporolactobacillus, Tetragenococcus, Vagococcus* and *Weisella*, and combinations thereof. Most preferably, the lactic acid bacteria are species of *lactobacilli*, most preferably chosen from the group consisting of: *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii*, and *Lactobacillus casei*, and mixtures thereof, for example from the group consisting of: *Lactobacillus fermentum, Lactobacillus crispatus, Lactobacillus panis, Lactobacillus mucosae, Lactobacillus pontis, Lactobacillus acidophilus* and mixtures thereof, for example from the group consisting of: *Lactobacillus fermentum, Lactobacillus crispatus, Lactobacillus panis, Lactobacillus mucosae, Lactobacillus pontis*, and mixtures thereof, for example said bacteria are *Lactobacillus fermentum* or *Lactobacillus crispatus*. In some embodiments, the fermentation may be a spontaneous fermentation (i.e. in which no fermentation microorganism is deliberately added, but the fermentation is performed by microorganisms which are naturally present on/in the peas and/or in the environment) or an inoculated fermentation (i.e. in which fermentation microorganisms are deliberately added). The fermentation may also be carried out by transferring a part or all of the aqueous fraction from a fermentation step to a following fermentation that will be subsequently initiated, for example by transferring at least $\frac{1}{10}$th of the volume of the first fermentation to at least one second fermentation step. In one preferred embodiment, the fermentation is an anaerobic fermentation.

In one embodiment, the aqueous composition comprising peas is subjected to a fermentation in step (b) of the process described above until the pH of the peas is at most 5.5, preferably at most 5.0, more preferentially between 3.5 and 5, preferably measured at ambient temperature on 1 g of said peas which have been ground and then suspended in 9 g of water, as described in the experimental section. In one embodiment, the aqueous composition comprising peas is subjected to a fermentation in step (b) of the process described above until the pH of the peas is at least 3.5, for example at least 3.75, for example at least 4.0, for example at least 4.25, for example at least 4.50, for example at least 4.75, for example at most 5.0, for example at most 5.25, for example at most 5.5, between 3.5 and 4.5, for example between 4.0 and 5.0, preferably between 4.5 and 5.5, for instance preferably measured at ambient temperature on 1 g of said peas which has been ground and then suspended in 9 g of water, as described in the experimental section.

In one embodiment, the aqueous composition comprising peas is subjected to a fermentation in step (b) of the process described above until the pH of the peas decreases by at least 1 pH unit, preferably by at least 1.5 pH units, for instance by at least 1, for example by at least 1.1, for example by at least 1.2, for example by at least 1.3, for example by at least 1.4, for example by at least 1.5, for example by at least 1.6, for example by at least 1.7, for example by at least 1.8, for example by at least 1.9, for example by at least 2, for example by at least 2.1, for example by at least 2.2, for example by at least 2.3, for example by at least 2.4, for example by at least 2.5, for example by at least 2.6, for example by at least 2.7, for example by at least 2.8, for example by at least 2.9, for example by at least 3 pH units, preferably measured at ambient temperature on 1 g of said peas which have been ground and then suspended in 9 g of water.

In another embodiment, the aqueous composition comprising peas is subjected to a fermentation in step (b) of the process described above until the pH of the peas decreases by 1 pH unit to 3 pH units, preferably by 1.5 pH units to 3 pH units, for instance by 1.5 pH units to 2.5 pH units, for example by 2.0 pH units to 3.0 pH units, preferably measured at ambient temperature on 1 g of said peas which have been ground and then suspended in 9 g of water.

By way of example, and without limitation, at the beginning of the fermentation, the pH of the peas may be 6.5 and at the end of the fermentation, the pH of the peas may be 5.0, preferably measured at ambient temperature on 1 g of said peas which have been ground and then suspended in 9 g of water, as described in the experimental section.

In one embodiment, the aqueous composition comprising peas is subjected to a fermentation in step (b) of the process described above at a temperature which is optimal for the fermentation microorganisms, preferably at a temperature which is at most 5° C. above or below the optimal temperature for the fermentation microorganisms. The optimal temperatures for the bacteria and/or the yeasts as defined herein are known in the art. As further information, it can be specified, without limitation, that an optimal temperature, as defined herein, refers to the temperature at which the growth is at a maximum. In one additional embodiment, the aqueous composition comprising peas is subjected to a fermentation in step (b) of the process described above at a temperature of at least 30° C., for example of between 30° C. and 50° C., preferably between 35° C. and 45° C. In another embodiment, the aqueous composition comprising peas is subjected to a fermentation in step (b) of the process described above at a temperature of between 30° C. and 40° C., between 35° C. and 45° C., or between 40° C. and 50° C., preferably a temperature of 40° C. or of about 40° C.

In one embodiment, the aqueous composition comprising peas is subjected to a fermentation in step (b) of the process described above in the presence of fermentation microorganisms, such as bacteria and/or yeasts, preferably comprising one or more lactic acid bacteria and/or yeasts, more preferentially said fermentation microorganisms are chosen from the group consisting of one or more species of lactobacilli and/or yeasts. In one embodiment, the fermentation is carried out in the presence of one or more of the microorganisms specified above at a concentration of between $10^2$ cfu/ml and $10^{10}$ cfu/ml of said aqueous composition comprising peas, such as a concentration of at least $10^2$ cfu/ml, for example of at least $10^5$ cfu/ml, for example of at least $10^6$ cfu/ml, for example of at least $10^7$ cfu/ml, for example of at least $10^8$ cfu/ml, for example of at least $10^9$ cfu/ml of said aqueous composition comprising peas. The units "cfu" (colony forming units) are well known in the art and can be determined for example by plate counting. It is understood that "cfu/ml" refers to the amount of colony forming units per ml of the total aqueous composition comprising peas, including the peas.

In another embodiment, the aqueous composition comprising peas is subjected to a fermentation in step (b) of the process described above in the presence of fermentation microorganisms, preferably comprising one or more lactic acid bacteria and/or yeasts, more preferentially comprising one or more species of lactobacilli, in which the microorganisms are added at a concentration of at least $10^2$ cfu/ml of the aqueous composition comprising peas.

In one embodiment, the peas after step (b) and before step (c) of the process described above, i.e. at the end of the hydration and before the grinding step, have a solids content (by weight) of between 35% and 70%, preferably between 35% and 55%, for example between 40% and 50%, for instance a solids content of at least 40%, for example of at least 41%, of at least 42%, for example of at least 43%, for example of at least 44%, for example of at least 45%, for example of at least 46%, for example of at least 47%, of about 48%, of about 49%, for example of at most 50%, for example of at most 55%, for example of at most 60% on the basis of the total weight of the peas at the end of the hydration, i.e. after the peas have been isolated from the aqueous composition.

In step (c) of the process according to the invention described above, the peas which have been subjected to hydration in step (b) are ground. To this effect, in one embodiment, the peas are removed from the aqueous composition after step (b) and then subjected to grinding. Preferably, the peas are washed or rinsed after step (b) and before step (c). The washing and the rinsing can be carried out with an aqueous solution, preferably water, such as tap water, or treated well water, preferably drinking water, demineralized water, i.e. water fit for human consumption.

As used herein, the term "grinding peas" has the meaning commonly accepted in the art. As additional information, it can be specified that the grinding, as used herein, can refer to the process of milling the solid matter, i.e. the peas, by exposure to mechanical forces which destroy the structure by overcoming the internal bonding forces. The grinding can thus disintegrate the original structure of the peas. In one preferred embodiment, the size of the ground pea particles comprising at least 25% of solids is such that they have a D50 of at most 300 μm, preferably of at most 250 μm, for example of at most 200 μm, the D50 being defined as being the size of the particles for which fifty percent by volume of the particles have a size less than the D50; and the D50 being measured by laser diffraction analysis on a Malvern-type analyzer.

For example, the D50 can be measured by sieving or by laser diffraction analysis. For example, the Malvern Instruments laser diffraction systems can be advantageously used. The size of the particles can be measured by laser diffraction analysis on a Malvern-type analyzer. The size of the particles can be measured by laser diffraction analysis on a Malvern-type analyzer after the peas have been ground and incorporated into an aqueous suspension having a solids content of 25%. The suitable Malvern systems comprise the Malvern 2000, Malvern MasterSizer 2000 (such as MasterSizer S), Malvern 2600 and Malvern 3600 instruments. These instruments and also their operating manual meet or even exceed the requirements defined in standard ISO 13320. The Malvern MasterSizer instrument (such as MasterSizer S) can also be of use since it can more accurately measure the D50 towards the lower end of the range for example for average particle sizes of less than 8 μm, by applying the Mie theory, using appropriate optical means.

In one embodiment, before, during or after the grinding of the peas in step (c) of the process according to the invention described above, an aqueous solution, preferably water, such as tap water, or treated well water, or demineralized water, preferably drinking water, i.e. water fit for human consumption, is added to the peas. In one additional embodiment, an amount of aqueous solution is added to the peas so as to obtain an aqueous composition comprising ground peas, said composition preferably comprising between 15% and 35% of solids on the basis of the total weight of the composition, preferably between 15% and 35%, preferably between 20% and 30%, such as at least 19%, such as at least 20%, such as at least 21%, such as at least 22%, for example at least 23%, for example at least 24%, for example at least 25%, for example at least 26%, for example at least 27%, for example at least 28%, for example at least 29%, for example at most 30%, for example at most 35% of solids on the basis of the total weight of the composition. In one preferred embodiment, the grinding process is a wet grinding process, in such a way that an aqueous solution is added to the peas before or during grinding.

As used herein, the term "fractionation" refers to a process by which at least one part of the fibres included in the peas is separated from the rest of the peas. It is understood that, when reference is made to the fractionation step, in some embodiments, not all but nevertheless the vast majority of the fibres are separated, preferably at least 50% of fibres, by weight, preferably at least 60% of fibres, by weight, on the basis of the total content of the fibres of the ground peas, are separated. The fractionation of said ground peas in step (d) comprises subjecting said ground peas to at least one step of separation by centrifugation and/or filtration.

In one embodiment, the fractionation step (d) comprises at least one step (d1), the step of fractionating said ground peas in step (d1) comprising subjecting said ground peas to at least one step of settling out, of filtration and/or of separation in order to obtain a fibre-enriched fraction.

According to one preferred embodiment, the fractionation step (d) can be divided into at least two fractionation steps (d1) and (d2).

The step of fractionating (d1) the ground peas into a fibre-enriched fraction can be carried out by any means known in the art, such as the addition of a base or of an appropriate salt.

Preferably, the ground peas are fractionated by increasing the pH of the ground peas.

Preferably, the fractionation step (d1) comprises the adjustment of the pH of the ground peas to a pH of at least 6, preferably of at least 7, most preferably to a pH of at least 8 and of at most 9.

Preferably, the fractionation step (d1) comprises increasing the pH of an aqueous composition comprising ground peas. In one preferred embodiment, the pH of the composition is adjusted to a pH of at least 6, more preferentially of at least 7. In another preferred embodiment, the pH of the composition is adjusted to a value of between pH 6 and pH 9, more preferentially between pH 7 and pH 9, such as a pH of at least 7.0, for example of at least 7.1, for example of at least 7.2, for example of at least 7.3, for example of at least 7.4, for example of at least 7.5, for example of at least 7.6, for example of at least 7.7, for example of at least 7.8, for example of at least 7.9, for example of at least 8.0, for example of at least 8.1, for example of at least 8.2, for example of at least 8.3, for example of at least 8.4, for example of at most 8.5, for example of at most 8.6, for example of at most 8.7, for example of at most 8.8, for example of at most 8.9, for example of at most 9.0, most preferably a pH of between pH 7.5 and pH 8.5, most preferably pH 8 or about pH 8. Preferably, this adjustment of the pH is carried out on an aqueous composition comprising ground peas having a solids content of at most 45%, preferably of at most 40%, preferably of at most 35%, preferably of at most 30%, preferably of at most 25%. In one embodiment, the solids content of the ground peas is adjusted to the abovementioned solids content by adding water accordingly. This adjustment of the pH can be carried out using any appropriate base, such as sodium hydroxide, calcium hydroxide, potassium hydroxide and the like. In one preferred embodiment, the pH of the compositions containing ground peas is adjusted by adding sodium hydroxide.

In one particular embodiment, said ground peas, after optional adjustment of the pH, are subjected to at least one settling out step, preferably at least one step of settling out by centrifugation, in which the settling out pellets comprise a fibre-enriched fraction.

In another embodiment, said ground peas, after optional adjustment of the pH, are subjected to at least one filtration step, in which the cake comprises a pea extract comprising fibres.

In another embodiment, said ground peas, after optional adjustment of the pH, are subjected to at least one step of separation by hydrocyclones, in which the underflow comprises a fibre-enriched fraction.

In another preferred embodiment, said ground peas, after optional adjustment of the pH, are subjected to at least one settling out step, preferably to at least one step of settling out by centrifugation in order to obtain pellets, and the subjecting of these pellets obtained to at least one filtration step.

In another embodiment, said ground peas, after optional adjustment of the pH, are subjected to at least one step of separation by hydrocyclones, in which the underflow comprises a fibre-enriched fraction, and the subjecting of these underflows to at least one step of settling out by centrifugation.

As indicated elsewhere in the present document, step (d) and step (c) of the process according to the invention can be carried out simultaneously or, in the alternative, step (d) can be carried out following step (c).

It is understood that the fibre-rich fraction can also comprise other constituents, in particular those which are made insoluble or remain insoluble during the fractionation step.

In one embodiment, the fibre-enriched fraction has a solids content of at least 35% on the basis of the total weight of the composition, preferably a solids content of at least 36%, more preferentially a solids content of at least 37%, for instance a solids content of at least 38%, for instance a solids content of at least 39%, for instance a solids content of at least 40%, of at least 41%, of at least 42%, of at least 43%, of at least 44%, of at least 45%, of at least 46%, of at least 47%, of at least 48%, of at least 49%, of at least 50%. In one embodiment, the fibre-enriched fraction has a solids content of at most 50% on the basis of the total weight of the composition, preferably a solids content of at most 51%, more preferentially a solids content of at most 52%, for instance a solids content of at most 53%, for instance a solids content of at most 54%, for instance a solids content of at most 55%. In another embodiment, the fibre-enriched fraction has a solids content of between 35% and 55% on the basis of the total weight of the composition, preferably a solids content of between 40% and 50%.

In one embodiment, the fibre-enriched fraction comprises, on the basis of the solids, at least 50% of starch, by weight, more preferentially at least 51% of starch, by weight, at least 52% of starch, by weight, for instance at least 53% of starch, by weight, for instance at least 54% of starch, by weight, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70% of starch, by weight, at least 71% of starch, by weight, at least 72% of starch, by weight, at least 73% of starch, by weight, at least 74% of starch, by weight, at least 75% of starch, by weight, at least 76% of starch, by weight, at least 77% of starch, by weight, at least 78% of starch, by weight, at least 79% of starch, by weight, at least 80% of starch, by weight, and at most 90% of starch, by weight, at most 89% of starch, by weight, at most 88% of starch, by weight, at most 87% of starch, by weight, at most 86% of starch, by weight, at most 85% of starch, by weight, at most 84% of starch, by weight, at most 83% of starch, by weight, at most 82% of starch, by weight, at most 81% of starch, by weight, at most 80% of starch, by weight, at most 79% of starch, by weight, at most 78% of starch, by weight, at most 77% of starch, by weight, at most 76% of starch, by weight, at most 75% of starch, by weight, at most 74% of starch, by weight, at most 73% of starch, by weight, at most 72% of starch, by weight, at most 71% of starch, by weight, at most 70% of starch, by weight, at most 69% of starch, by weight, at most 68% of starch, by weight, at most 67% of starch, by weight, at most 66% of starch, by weight, at most 65% of starch, by weight, at most 64% of starch, by weight, at most 63% of starch, by weight, at most 62% of starch, by weight, at most 61% of starch, by weight, at most 60% of starch, by weight. In one embodiment, the fibre-enriched fraction comprises, on the basis of the solids, between 60% of starch, by weight, and 80% of starch, by weight, for example between 65% of starch, by weight, and 75% of starch, by weight.

The fractionation of the fibre-enriched fraction into a pea extract comprising fibres can be carried out by any means known in the art, such as sieving. The finest particles not retained on the sieve correspond to the starch particles and also to the soluble molecules contained in the aqueous phase. The fibres and also a part of the starch linked to the fibres are retained on the sieve.

In one embodiment, 90% of the particles of the pea extract comprising fibres have a size<700 µm, measured by wet particle size analysis, more preferentially a size<500 µm, measured by wet particle size analysis.

In one embodiment, 50% of the particles of the pea extract comprising fibres have a size<450 µm, measured by wet particle size analysis, more preferentially a size<400 µm, measured by wet particle size analysis.

In one embodiment, the pea extract comprising fibres comprises, on the basis of the solids, at least 10% of starch, by weight, more preferentially at least 11% of starch, by weight, at least 12% of starch, by weight, for instance at least 13% of starch, by weight, at least 14% of starch, by weight, at least 15% of starch, by weight, at least 16% of starch, by weight, at least 17% of starch, by weight, at least 18% of starch, by weight, at least 19% of starch, by weight, at least 20% of starch, by weight, at least 21% of starch, by weight, at least 22% of starch, by weight, at least 23% of starch, by weight, at least 24% of starch, by weight, at least 25% of starch, by weight, at least 26% of starch, by weight, at least 27% of starch, by weight, at least 28% of starch, by weight, at least 29% of starch, by weight, at least 30% of starch, by weight, at least 31% of starch, by weight, at least 32% of starch, by weight, at least 33% of starch, by weight, at least 34% of starch, by weight, at least 35% of starch, by weight, at least 36% of starch, by weight, at least 37% of starch, by weight, at least 38% of starch, by weight, at least 39% of starch, by weight, at least 40% of starch, by weight, at least 41% of starch, by weight, more preferentially at least 42% of starch, by weight, for instance at least 43% of starch, by weight, for instance at least 44% of starch, by weight, at least 45% of starch, by weight, at least 46% of starch, by weight, at least 47% of starch, by weight, at least 48% of starch, by weight, at least 49% of starch, by weight, at least 50% of starch, by weight, at least 51% of starch, by weight, at least 52% of starch, by weight, at least 53% of starch, by weight, at least 54% of starch, by weight, at least 55% of starch, by weight, and at most 60% of starch, by weight, at most 59% of starch, by weight, at most 58% of starch, by weight, at most 57% of starch, by weight, at most 56% of starch, by weight, at most 55% of starch, by weight, at most 54% of starch, by weight, at most 53% of starch, by weight, at most 52% of starch, by weight, at most 51% of starch, by weight, at most 50% of starch, by weight, at most 49% of starch, by weight, at most 48% of starch, by weight, at most 47% of starch, by weight, at most 46% of starch, by weight, at most 45% of starch, by weight, at most 44% of starch, by weight, at most 43% of starch, by weight, at most 42% of starch, by weight, at most 41% of starch, by weight, at most 40% of starch, by weight, at most 39% of starch, by weight, at most 38% of starch, by weight, at most 37% of starch, by weight, at most 36% of starch, by weight, at most 35% of starch, by weight.

In some embodiments of the invention, the pea extract comprising fibres has a fibres/starch weight ratio of at least 40/60, of at least 41/59, of at least 42/58, of at least 43/57, of at least 44/56, of at least 45/55, preferably of at least 46/54, of at least 47/53, of at least 48/52, of at least 49/51, of at least 50/50, preferably of at least 51/49, of at least 52/48, of at least 53/47, of at least 54/46, of at least 55/45, preferably of at least 56/44, of at least 57/43, of at least 58/42, of at least 59/41, of at least 60/40. In some embodiments, the pea extract comprising fibres has a fibres/starch weight ratio of at most 85/15, of at most 84/16, of at most 83/17, of at most 82/18, of at most 81/19, of at most 80/20, of at most 79/21, of at most 78/22, of at most 77/23, of at most 76/24, preferably of at most 75/25, of at most 74/26, of at most 73/27, of at most 72/28, of at most 71/29, preferably of at most 70/30, of at most 69/31, of at most 68/32, of at most 67/33, of at most 66/34, preferably of at most 65/35. In some embodiments, the pea extract comprising fibres has a fibres/starch weight ratio of between 40/60 and 85/15, for example between 50/50 and 70/30, for example between 55/45 and 65/35.

In some embodiments of the invention, the pea extract comprising fibres has a water retention of at least 5 g of water/g of solids, of at least 6 g of water/g of solids, of at least 7 g of water/g of solids, of at least 8 g of water/g of solids, of at least 9 g of water/g of solids, of at least 10 g of water/g of solids; the water retention being determined by the following method:
  Accurately weighing out 2.00 g of solids of pea extract comprising fibres into a pre-tared tube (P1)
  Adding the amount of water sufficient to obtain a final volume of water of 38 ml
  Shaking the tube manually for 5 seconds
  Leaving the tube to stand for 18 hours
  Centrifuging the medium at 1820 G for 10 minutes
  Leaving the tube to stand again for 10 minutes
  Discarding the supernatant
  Weighing the tube containing the pellet (P2)
  Applying the formula RE=((P2−P1)−(m×% solids/100))/(m×solids/100)
  With P1: Tare of the tube (g); P2: Mass tare+pellet (g); m: mass of pea extract comprising fibres (g).

In some embodiments of the invention, the pea extract comprising fibres has a water retention of at most 21 g of water/g of solids, of at most 20 g of water/g of solids, of at most 19 g of water/g of solids, of at most 18 g of water/g of solids, of at most 17 g of water/g of solids, of at most 16 g of water/g of solids, of at most 15 g of water/g of solids, of at most 14 g of water/g of solids.

In some embodiments of the invention, the pea extract comprising fibres has a water retention of at least 5 g of water/g of solids, of at least 6 g of water/g of solids, of at least 7 g of water/g of solids, of at least 8 g of water/g of solids, of at least 9 g of water/g of solids, of at least 10 g of water/g of solids, of at least 11 g of water/g of solids, of at least 12 g of water/g of solids, of at least 13 g of water/g of solids.

In some embodiments of the invention, the pea extract comprising fibres has a water retention of between 5 g of water/g of solids and 21 g of water/g of solids, more preferentially between 8 g of water/g of solids and 18 g of water/g of solids and even more preferentially between 10 g of water/g of solids and 16 g of water/g of solids, and even more preferentially between 12 g of water/g of solids and 14 g of water/g of solids.

In another additional step, the pea extracts comprising fibres can be subjected to drying, whether or not they have been subjected beforehand to an increase in the solids.

In one preferred embodiment, in order to increase the solids of the pea extract comprising fibres, a concentration step can be carried out, for example by passing through a press or a decanter, more particularly through a press.

In one embodiment, the pea extract comprising fibres, after a concentration step, has a solids content of at least 8% on the basis of the total weight of the composition, preferably a solids content of at least 15%, more preferentially a solids content of at least 20%, of at least 25%, of at least 30%, of at least 35%.

In another embodiment, the pea extract comprising fibres, after passing through a press, comprises a solids content of between 8% and 40% on the basis of the total weight of the composition, preferably from 20% to 30%, more preferentially from 25% to 35%.

In one embodiment, at least one step of drying (e) said pea extract comprising fibres is carried out.

The drying can be carried out by any means known in the art, such as by application of hot air, evaporation, lyophilization, contact drying, steam drying, dielectric drying, drying on rolls, flash drying, whirl flash drying, drying on a fluidized air bed, etc. In one preferred embodiment, the pea extract comprising fibres is dried on a flash drier.

In one particular embodiment, before the drying step (e), a step of increasing the solids is carried out, more preferentially by means of recirculating the dried product.

In one embodiment, the pea extract comprising fibres that is obtained after the drying step (e) has a solids content of at least 80% on the basis of the total weight of the composition.

In one embodiment, the pea extract comprising fibres that is obtained after the drying step (e) has a solids content of at most 95% on the basis of the total weight of the composition, of at most 94%, of at most 93%, of at most 92%, of at most 91%, more preferentially of at most 90%, of at most 89%, of at most 88%, of at most 87%, of at most 86%, of at most 85%.

In one embodiment, the pea extract comprising fibres that is obtained after a drying step (e) comprises, on the basis of the solids, at least 35% of fibres, by weight, and at most 90% of fibres, by weight, between 35% of fibres, by weight, and 90% of fibres, by weight, more preferentially between 40% and 85% of fibres, by weight, more preferentially between 45% of fibres, by weight, and 80% of fibres, by weight, at least 36% of fibres, by weight, at least 37% of fibres, by weight, at least 38% of fibres, by weight, at least 39% of fibres, by weight, at least 40% of fibres, by weight, at least 41% of fibres, by weight, at least 42% of fibres, by weight, at least 43% of fibres, by weight, at least 44% of fibres, by weight, at least 45% of fibres, by weight, at least 46% of fibres, by weight, at least 47% of fibres, by weight, at least 48% of fibres, by weight, at least 49% of fibres, by weight, at least 50% of fibres, by weight, at least 51% of fibres, by weight, at least 52% of fibres, by weight, at least 53% of fibres, by weight, at least 54% of fibres, by weight, at least 55% of fibres, by weight, at least 56% of fibres, by weight, at least 57% of fibres, by weight, at least 58% of fibres, by weight, at least 59% of fibres, by weight, at least 60% of fibres, by weight, at least 61% of fibres, by weight, at least 62% of fibres, by weight, at least 63% of fibres, by weight, at least 64% of fibres, by weight, at least 65% of fibres, by weight, at least 66% of fibres, by weight, at least 67% of fibres, by weight, at least 68% of fibres, by weight, at least 69% of fibres, by weight, at least 70% of fibres, by weight.

In one embodiment, the pea extract comprising fibres that is obtained after a drying step (e) comprises, on the basis of the solids, at most 60% of fibres, by weight, at most 61% of fibres, by weight, at most 62% of fibres, by weight, at most 63% of fibres, by weight, at most 64% of fibres, by weight, at most 65% of fibres, by weight, at most 66% of fibres, by weight, at most 67% of fibres, by weight, at most 68% of fibres, by weight, at most 69% of fibres, by weight, at most 70% of fibres, by weight, at most 71% of fibres, by weight, at most 72% of fibres, by weight, at most 73% of fibres, by weight, at most 74% of fibres, by weight, at most 75% of fibres, by weight, at most 76% of fibres, by weight, at most 77% of fibres, by weight, at most 78% of fibres, by weight, at most 79% of fibres, by weight, at most 80% of fibres, by weight, at most 81% of fibres, by weight, at most 82% of fibres, by weight, at most 83% of fibres, by weight, at most 84% of fibres, by weight, at most 85% of fibres, by weight, at most 86% of fibres, by weight, at most 87% of fibres, by weight, at most 88% of fibres, by weight, at most 89% of fibres, by weight, at most 90% of fibres, by weight.

In one embodiment, the pea extract comprising fibres that is obtained after the drying step (e) comprises, on the basis of the solids, at least 10% of starch, by weight, more preferentially at least 11% of starch, by weight, at least 12% of starch, by weight, for instance at least 13% of starch, by weight, at least 14% of starch, by weight, at least 15% of starch, by weight, at least 16% of starch, by weight, at least 17% of starch, by weight, at least 18% of starch, by weight, at least 19% of starch, by weight, at least 20% of starch, by weight, at least 21% of starch, by weight, at least 22% of starch, by weight, at least 23% of starch, by weight, at least 24% of starch, by weight, at least 25% of starch, by weight, at least 26% of starch, by weight, at least 27% of starch, by weight, at least 28% of starch, by weight, at least 29% of starch, by weight, at least 30% of starch, by weight, at least 31% of starch, by weight, at least 32% of starch, by weight, at least 33% of starch, by weight, at least 34% of starch, by weight, at least 35% of starch, by weight, at least 36% of starch, by weight, at least 37% of starch, by weight, at least 38% of starch, by weight, at least 39% of starch, by weight, at least 40% of starch, by weight, at least 41% of starch, by weight, more preferentially at least 42% of starch, by weight, for instance at least 43% of starch, by weight, for instance at least 44% of starch, by weight, at least 45% of starch, by weight, at least 46% of starch, by weight, at least 47% of starch, by weight, at least 48% of starch, by weight, at least 49% of starch, by weight, at least 50% of starch, by weight, at least 51% of starch, by weight, at least 52% of starch, by weight, at least 53% of starch, by weight, at least 54% of starch, by weight, at least 55% of starch, by weight, and at most 60% of starch, by weight, at most 59% of starch, by weight, at most 58% of starch, by weight, at most 57% of starch, by weight, at most 56% of starch, by weight, at most 55% of starch, by weight, at most 54% of starch, by weight, at most 53% of starch, by weight, at most 52% of starch, by weight, at most 51% of starch, by weight, at most 50% of starch, by weight, at most 49% of starch, by weight, at most 48% of starch, by weight, at most 47% of starch, by weight, at most 46% of starch, by weight, at most 45% of starch, by weight, at most 44% of starch, by weight, at most 43% of starch, by weight, at most 42% of starch, by weight, at most 41% of starch, by weight, at most 40% of starch, by weight, at most 39% of starch, by weight, at most 38% of starch, by weight, at most 37% of starch, by weight, at most 36% of starch, by weight, at most 35% of starch, by weight.

In some embodiments of the invention, the pea extract comprising fibres that is obtained after the drying step (e) has a fibres/starch weight ratio of at least 40/60, of at least 41/59, of at least 42/58, of at least 43/57, of at least 44/56, of at least 45/55, preferably of at least 46/54, of at least 47/53, of at least 48/52, of at least 49/51, of at least 50/50, preferably of at least 51/49, of at least 52/48, of at least 53/47, of at least 54/46, of at least 55/45, preferably of at least 56/44, of at least 57/43, of at least 58/42, of at least 59/41, of at least 60/40. In some embodiments, the pea extract comprising fibres has a fibres/starch weight ratio of at most 85/15, of at most 84/16, of at most 83/17, of at most 82/18, of at most 81/19, of at most 80/20, of at most 79/21, of at most 78/22, of at most 77/23, of at most 76/24, preferably of at most 75/25, of at most 74/26, of at most 73/27, of at most 72/28, of at most 71/29, preferably of at most 70/30, of at most 69/31, of at most 68/32, of at most 67/33, of at most 66/34, preferably of at most 65/35. In some embodiments, the pea extract comprising fibres has a fibres/starch weight ratio of between 40/60 and 85/15, for example between 50/50 and 70/30, for example between 55/45 and 65/35.

In some embodiments of the invention, the pea extract comprising fibres that is obtained after the drying step (e) has a water retention of at least 5 g of water/g of solids, of at least 6 g of water/g of solids, of at least 7 g of water/g of solids, of at least 8 g of water/g of solids, of at least 9 g of water/g of solids, of at least 10 g of water/g of solids, of at least 11 g of water/g of solids, of at least 12 g of water/g of solids.

In some embodiments of the invention, the pea extract comprising fibres that is obtained after the drying step (e) has a water retention of at most 20 g of water/g of solids, of at most 19 g of water/g of solids, of at most 18 g of water/g of solids, of at most 17 g of water/g of solids, of at most 16 g of water/g of solids, of at most 15 g of water/g of solids, of at most 14 g of water/g of solids, of at most 13 g of water/g of solids, of at most 12 g of water/g of solids.

In some embodiments of the invention, the pea extract comprising fibres that is obtained after the drying step (e) has a water retention of between 5 g of water/g of solids and 21 g of water/g of solids, more preferentially between 8 g of water/g of solids and 18 g of water/g of solids and even more preferentially between 10 g of water/g of solids and 16 g of water/g of solids, and even more preferentially between 12 g of water/g of solids and 14 g of water/g of solids.

In some embodiments of the invention, the pea extract comprising fibres that is obtained after the drying step (e) has an oil retention of between 2.5 g of oil/g of solids and 5.0 g of oil/g of solids, more preferentially between 2.7 g of oil/g of solids and 3.5 g of oil/g of solids and even more preferentially between 2.9 g of oil/g of solids and 3.4 g of oil/g of solids, and even more preferentially between 3.0 g of oil/g of solids and 3.4 g of oil/g of solids.

In one embodiment, the pea extract comprising fibres that is obtained after the drying step (e) has a gel strength after heat treatment of between 400 g and 900 g, more preferentially of between 450 g and 700 g, more preferentially of between 450 g and 650 g, more preferentially of between 450 g and 600 g, even more preferentially of between 500 g and 600 g.

In one embodiment, 90% of the particles of the pea extract comprising fibres that is obtained after the drying step (e) have a size<700 µm, measured by dry particle size analysis, more preferentially a size<600 µm, measured by dry particle size analysis, even more preferentially a size<500 µm, measured by dry particle size analysis, In one embodiment, 50% of the particles of the pea extract comprising fibres that is obtained after the drying step (e) have a size<400 µm, measured by dry particle size analysis, more preferentially a size<300 µm, measured by dry particle size analysis.

In one embodiment, a second grinding can be carried out after or during step (d) at any time, preferably after step (e).

In one embodiment, the pea extract comprising fibres that is obtained after a second grinding comprises, on the basis of the solids, at least 35% of fibres, by weight, and at most 90% of fibres, by weight, between 35% of fibres, by weight, and 90% of fibres, by weight, more preferentially between 40% and 85% of fibres, by weight, more preferentially between 45% of fibres, by weight, and 80% of fibres, by weight, at least 36% of fibres, by weight, at least 37% of fibres, by weight, at least 38% of fibres, by weight, at least 39% of fibres, by weight, at least 40% of fibres, by weight, at least 41% of fibres, by weight, at least 42% of fibres, by weight, at least 43% of fibres, by weight, at least 44% of fibres, by weight, at least 45% of fibres, by weight, at least 46% of fibres, by weight, at least 47% of fibres, by weight, at least 48% of fibres, by weight, at least 49% of fibres, by weight, at least 50% of fibres, by weight, at least 51% of fibres, by weight, at least 52% of fibres, by weight, at least 53% of fibres, by weight, at least 54% of fibres, by weight, at least 55% of fibres, by weight, at least 56% of fibres, by weight, at least 57% of fibres, by weight, at least 58% of fibres, by weight, at least 59% of fibres, by weight, at least 60% of fibres, by weight, at least 61% of fibres, by weight, at least 62% of fibres, by weight, at least 63% of fibres, by weight, at least 64% of fibres, by weight, at least 65% of fibres, by weight, at least 66% of fibres, by weight, at least 67% of fibres, by weight, at least 68% of fibres, by weight, at least 69% of fibres, by weight, at least 70% of fibres, by weight, and at most 60% of fibres, by weight, at most 61% of fibres, by weight, at most 62% of fibres, by weight, at most 63% of fibres, by weight, at most 64% of fibres, by weight, at most 65% of fibres, by weight, at most 66% of fibres, by weight, at most 67% of fibres, by weight, at most 68% of fibres, by weight, at most 69% of fibres, by weight, at most 70% of fibres, by weight, at most 71% of fibres, by weight, at most 72% of fibres, by weight, at most 73% of fibres, by weight, at most 74% of fibres, by weight, at most 75% of fibres, by weight, at most 76% of fibres, by weight, at most 77% of fibres, by weight, at most 78% of fibres, by weight, at most 79% of fibres, by weight, at most 80% of fibres, by weight, at most 81% of fibres, by weight, at most 82% of fibres, by weight, at most 83% of fibres, by weight, at most 84% of fibres, by weight, at most 85% of fibres, by weight, at most 86% of fibres, by weight, at most 87% of fibres, by weight, at most 88% of fibres, by weight, at most 89% of fibres, by weight, at most 90% of fibres, by weight.

In some embodiments of the invention, the pea extract comprising fibres that is obtained after a second grinding has a fibres/starch weight ratio of at least 40/60, of at least 41/59, of at least 42/58, of at least 43/57, of at least 44/56, of at least 45/55, preferably of at least 46/54, of at least 47/53, of at least 48/52, of at least 49/51, of at least 50/50, preferably of at least 51/49, of at least 52/48, of at least 53/47, of at least 54/46, of at least 55/45, preferably of at least 56/44, of at least 57/43, of at least 58/42, of at least 59/41, of at least 60/40. In some embodiments, the pea extract comprising fibres has a fibres/starch weight ratio of at most 85/15, of at most 84/16, of at most 83/17, of at most 82/18, of at most 81/19, of at most 80/20, of at most 79/21, of at most 78/22, of at most 77/23, of at most 76/24, preferably of at most 75/25, of at most 74/26, of at most 73/27, of at most 72/28, of at most 71/29, preferably of at most 70/30, of at most 69/31, of at most 68/32, of at most 67/33, of at most 66/34, preferably of at most 65/35. In some embodiments, the pea extract comprising fibres has a fibres/starch weight ratio of between 40/60 and 85/15, for example between 50/50 and 70/30, for example between 55/45 and 65/35.

In one embodiment, the pea extract comprising fibres that is obtained after a second grinding comprises, on the basis of the solids, at least 10% of starch, by weight, more preferentially at least 11% of starch, by weight, at least 12% of starch, by weight, for instance at least 13% of starch, by weight, at least 14% of starch, by weight, at least 15% of starch, by weight, at least 16% of starch, by weight, at least 17% of starch, by weight, at least 18% of starch, by weight, at least 19% of starch, by weight, at least 20% of starch, by weight, at least 21% of starch, by weight, at least 22% of starch, by weight, at least 23% of starch, by weight, at least 24% of starch, by weight, at least 25% of starch, by weight, at least 26% of starch, by weight, at least 27% of starch, by weight, at least 28% of starch, by weight, at least 29% of starch, by weight, at least 30% of starch, by weight, at least 31% of starch, by weight, at least 32% of starch, by weight, at least 33% of starch, by weight, at least 34% of starch, by weight, at least 35% of starch, by weight, at least 36% of starch, by weight, at least 37% of starch, by weight, at least 38% of starch, by weight, at least 39% of starch, by weight, at least 40% of starch, by weight, at least 41% of starch, by weight, more preferentially at least 42% of starch, by weight, for instance at least 43% of starch, by weight, for instance at least 44% of starch, by weight, at least 45% of starch, by weight, at least 46% of starch, by weight, at least 47% of starch, by weight, at least 48% of starch, by weight, at least 49% of starch, by weight, at least 50% of starch, by weight, at least 51% of starch, by weight, at least 52% of starch, by weight, at least 53% of starch, by weight, at least 54% of starch, by weight, at least 55% of starch, by weight, and at most 60% of starch, by weight, at most 59% of starch, by weight, at most 58% of starch, by weight, at most 57% of starch, by weight, at most 56% of starch, by weight, at most 55% of starch, by weight, at most 54% of starch, by weight, at most 53% of starch, by weight, at most 52% of starch, by weight, at most 51% of starch, by weight, at most 50% of starch, by weight, at most 49% of starch, by weight, at most 48% of starch, by weight, at most 47% of starch, by weight, at most 46% of starch, by weight, at most 45% of starch, by weight, at most 44% of starch, by weight, at most 43% of starch, by weight, at most 42% of starch, by weight, at most 41% of starch, by weight, at most 40% of starch, by weight, at most 39% of starch, by weight, at most 38% of starch, by weight, at most 37% of starch, by weight, at most 36% of starch, by weight, at most 35% of starch, by weight.

In one embodiment, 50% of the particles of the pea extract comprising fibres that is obtained after a second grinding have a size<200 μm, measured by dry particle size analysis, more preferentially a size<100 μm, measured by dry particle size analysis.

In one embodiment, 90% of the particles of the pea extract comprising fibres that is obtained after a second grinding have a size<400 μm, measured by dry particle size analysis, more preferentially a size<300 μm, measured by dry particle size analysis.

In some embodiments of the invention, the pea extract comprising fibres that is obtained after a second grinding has a water retention of at least 5 g of water/g of solids, of at least 6 g of water/g of solids, of at least 7 g of water/g of solids, of at least 8 g of water/g of solids, of at least 9 g of water/g of solids, of at least 10 g of water/g of solids, of at least 11 g of water/g of solids, of at least 12 g of water/g of solids.

In some embodiments of the invention, the pea extract comprising fibres that is obtained after a second grinding has a water retention of at most 20 g of water/g of solids, of at most 19 g of water/g of solids, of at most 18 g of water/g of solids, of at most 17 g of water/g of solids, of at most 16 g of water/g of solids, of at most 15 g of water/g of solids, of at most 14 g of water/g of solids, of at most 13 g of water/g of solids, of at most 12 g of water/g of solids.

In some embodiments of the invention, the pea extract comprising fibres that is obtained after a second grinding has a water retention of between 5 g of water/g of solids and 21 g of water/g of solids, more preferentially between 8 g of water/g of solids and 18 g of water/g of solids and even more preferentially between 10 g of water/g of solids and 16 g of water/g of solids, and even more preferentially between 12 g of water/g of solids and 14 g of water/g of solids.

In some embodiments of the invention, the pea extract comprising fibres that is obtained after a second grinding has an oil retention of between 1.5 g of oil/g of solids and 5.0 g of oil/g of solids, more preferentially between 2.0 g of oil/g of solids and 4.5 g of oil/g of solids and even more preferentially between 2.0 g of oil/g of solids and 3.5 g of oil/g of solids, and even more preferentially between 2.0 g of oil/g of solids and 2.5 g of oil/g of solids.

In one embodiment, the pea extract comprising fibres that is obtained after a second grinding has a gel strength after heat treatment of between 250 g and 900 g, more preferentially of between 250 g and 700 g, more preferentially of between 300 g and 650 g, more preferentially of between 300 g and 500 g, even more preferentially of between 300 g and 400 g.

The present invention also relates to a pea extract comprising fibres, characterized in that it comprises:
  a fibres/starch weight ratio of between 30/70 and 85/15;
  an amount of fibres of between 35% and 80% on the basis of the solids, assayed by the AOAC-985.29 method;
  a solids content between 80% and 95% on the basis of the total weight of the extract;
  a particle size D50<400 μm, measured by dry particle size analysis;
  a particle size D90<700 μm, measured by dry particle size analysis;
  a protein content of less than 5% on the basis of the solids; and
  in that it has a water retention of between 9 g of water/g of solids and 15 g of water/g of solids;
  an oil retention of between 2.5 g of oil/g of solids and 5.0 g of oil/g of solids; and
  a gel strength of between 400 g and 900 g.

The present invention also relates to a ground pea extract comprising fibres, characterized in that it comprises:
  a particle size D50<200 μm, measured by dry particle size analysis;
  a particle size D90<400 μm, measured by dry particle size analysis;
  an amount of fibres of between 35% and 80% on the basis of the solids, assayed by the AOAC-985.29 method;
  a fibres/starch weight ratio of between 30/70 and 85/15;
  a solids content of between 80% and 95% on the basis of the total weight of the extract; and
  a protein content of less than 5% on the basis of the solids; and in that it has
  a water retention of between 7 g of water/g of solids and 13 g of water/g of solids;
  an oil retention of between 1.5 g of oil/g of solids and 5.0 g of oil/g of solids; and
  a gel strength after heat treatment of at least 250 g and of at most 900 g, more preferentially between 300 and 400 g.

The pea extract comprising fibres that is obtained by means of the processes according to the invention described herein have different characteristics, such a different biochemical and/or organoleptic characteristics, and also a difference with regard to the values of the parameters linked to the quality by comparison with the pea extracts comprising fibres known in the prior art.

In another aspect, the present invention relates to a composition comprising a pea extract comprising fibres that is obtained or can be obtained by means of the processes according to the invention described herein. In one preferred embodiment, such a composition is an edible composition. Preferably, said composition is a food intended for food for human consumption or animal feed, more preferentially in restructured products which are meat-based, poultry-based, fish-based or vegetable products, for example in ham, burgers, meatballs, nuggets, cordon bleu products, pork and/or chicken and/or fish fresh sausages and sausages eaten cold in slices, meat/fish-based or vegetarian pâtés.

The aspects and the embodiments of the invention are also supported by the following non-limiting examples.

EXAMPLES

Protocols

Unless otherwise indicated, in the examples below, all the parameters are measured as defined in the present section. The measurement of the parameters, as defined in the present section, also represents, in the preferred embodiments, the process for measuring said parameters according to the invention as indicated in the respective aspects and embodiments of the description described above.

Assaying of the Amount of Fibres Included in the Pea Extract Comprising Fibres

This method is the AOAC 985.29 method. The method comprises gelatinization of the dried food samples (from which the fat has been extracted if it is greater than 10%) with Termamyl (heat-stable, α-amylase), then removal of the proteins and the starch by enzymatic digestion with a protease and an amyloglucosidase. When the analysis relates to food mixtures, the fat is extracted before the determination of total dietary fibres. Four volumes of ethyl alcohol were added in order to cause the soluble dietary fibre to precipitate. The total residue was filtered, and washed with 78% ethyl alcohol, then with 95% ethyl alcohol, and with acetone. After drying, the residue was weighed. A duplicate of the sample was used to analyze the proteins, and another duplicate was used in order to be incinerated at 525° C. so as to determine the amount of ash.

% total dietary fibres=residue−weight (proteins+ash).

Determination of the Solids Content

The total solids content measured by gravimetric analysis was determined as being the content of residues remaining after drying. The moisture was evaporated from the sample by drying in an oven.

5 g of sample were weighed into a pre-tared dry aluminium dish (Ohaus precision balance, capacity 410 g, sensitivity 0.001 g). The sample was placed in an oven at 103° C. until the residual weight remained constant (at least 24 hours). The sample was cooled in a desiccator for 1 h and then immediately weighed. The results are expressed as % (g of solids per 100 g of sample).

Solids content SC(%)=($m3-m1$)/($m2-m1$)×100

$m1$=weight of the dry aluminium dish (in g)
$m2$=weight of the aluminium dish with the sample before drying (in g)
$m3$=weight of the aluminium dish with the sample after drying (in g)

Determination of the Protein Content

AFNOR ISO/TS 16634-2:2009 method

The principle of the method is to determine the total nitrogen content by combustion according to the Dumas principle and to calculate the crude protein content. The samples are converted into gas by heating in a combustion tube. The interfering components are removed from the gas mixture obtained. The nitrogenous compounds of the gas mixture, or a representative part thereof, are converted into molecular nitrogen, which is quantitatively determined by means of a thermal conductivity detector. The nitrogen content of the sample is then calculated by a computer system. The conversion factor for obtaining the protein content from the nitrogen content is 6.25.

The results are expressed as %.

Assaying of the Starch

The aim is to determine the amount of starch present in a sample by enzymatically hydrolyzing the starch present. All of the starch and the glucose chains are hydrolyzed to glucose with α-amyloglucosidase. The glucose is assayed by HPLC. All of the glucose assayed is converted to starch. It is accepted that all the glucose present in the sample is derived from the starch.

Preparation of Solutions 200 ml of acetate buffer were prepared in the following way. In a beaker, about 160 ml of Milli-Q water were added to 31.95 g of sodium acetate. The medium was stirred with a magnetic bar in order to thoroughly dissolve everything. 24 ml of 96% acetic acid were then added and the pH was adjusted to 4.8 (between 4.75 and 4.85). The medium was then transferred into a 200 ml round-bottomed flask and the amount of liquid was adjusted to the line.

The solution of amyloglucosidase (*Aspergillus niger*) (Megazyme) (AMG solution) was prepared in the following way. 0.38 g of enzyme was added to Milli-Q water so as to obtain 40 g of sample. The whole mixture was mixed with a magnetic bar.

Preparation of the Standards for HPLC

First of all, the solids content of the glucose (see protocol above) was measured. According to table 1 below, the glucose was weighed out and then dissolved with about 50 ml of Milli-Q water. The whole mixture was transferred into a 100 ml flask and adjusted to the line. This solution was diluted for the standard to 0.5 g/l.

TABLE 1

| | | | | |
|---|---|---|---|---|
| Concentration of standard (g/l) | 0.5 | 2 | 3.5 | 5 |
| Mass of glucose to be weighed out (g) | 0.5 | 0.2 | 0.35 | 0.5 |
| Flask volume (ml) | 100 | 100 | 100 | 100 |
| Dilution | 10 g in 100 ml | none | none | none |

The theoretical concentration of the standards was calculated by correcting with the value of the solids content (SC) of the glucose. The values were verified five times on the same day by means of HPLC. If the value was correct, the solution was aliquoted into 1.5 ml eppendorf tubes after filtration on a 0.2 μm acrodisc (the following day at the latest) and the tubes were placed in a freezer.

Calculation of the concentration of each standard $$\text{Concentration} = m \times (SCglucose/100)/fm$$

m: mass of glucose (g); SC glucose: as %; fm: final mass (g)

Hydrolysis of the Sample 5 g of pea extract comprising fibres having a solids content of 20% were weighed into a Schott bottle and 25 ml of Milli-Q water were added (if the pea extract comprising fibres was dried, 1 g of sample is used). The whole thing was mixed. The bottle was placed in an autoclave at 130° C. for 1 h 30. After autoclaving, the bottle was left to cool to 60° C. 2.5 ml of acetate buffer, 45 g of Milli-Q water and 2 ml of AMG solution were added. The bottle was closed again and incubated in a water bath shaking at 180 rpm, at 60° C. for 2 hours. At the end of the incubation, the flask was wiped and weighed. The sample was filtered hot in a snap cap. The sample was diluted to ¼ (2.5 ml of solution in 7.5 ml of Milli-Q water in a 10 ml screw-cap tube). If the HPLC analysis cannot be carried out on the same day, the samples must be frozen. If the samples are frozen, the samples must be filtered on a 0.2 µm acrodisc into vials suitable for HPLC after thawing.

HPLC Analysis

The glucose was assayed by HPLC (calibrated with glucose solutions at 0.5, 2, 3.5 and 5 g/kg) (two columns; column type: Phenomenex Rezex K+ 8% ion exchange; eluent: 0.1 g/l of $KNO_3$ at pH between 9.4 and 9.6; eluent flow rate: 0.5 ml/min; analysis time: 45 minutes; detector: R-I refractometer of Waters brand).

Calculation $$\% \text{ starch}/SC = \text{result measured}(g/kg) \times \text{hydrolysis dilution factor} \times \text{HPLC dilution factor} \times (162/180)/(10 \times SC)$$

Determination of the Ash Content

The ash content measured by gravimetric analysis was determined as being the content of residues remaining after heating in a muffle furnace at high temperature. The moisture was evaporated from the sample by drying in an oven.

2 g of sample were weighed into a pre-tared dry porcelain crucible (Ohaus precision balance, capacity 410 g, sensitivity 0.001 g). The crucible was placed in a muffle furnace at 550° C. for 24 hours. The crucible was placed in an oven at 103° C. for 1 hour, and then in a desiccator for 1 hour. After cooling, the crucible was weighed. The results are expressed as % (g of ash per 100 g of sample).

$$\text{Ash}(\%) = (m3 - m1)/(m2 - m1) \times 100$$

m1=weight of the crucible (in g)
m2=weight of the crucible with the sample (in g)
m3=weight of the crucible with the ash (in g)

Measurement of the Water Retention (RE) of the Pea Extract Comprising Fibres

The RE corresponds to the mass of water that can be retained by 1 g of pea extract comprising fibres.

The RE can be measured on the dry pea extract comprising fibres and on the wet pea extract comprising fibres.

Firstly, the solids content of the sample was determined. The RE measurement was carried out in duplicate.

The empty tube P1 which was to be used for the trial was weighed. Two cases then occurred according to the nature of the sample:

The case of a dry pea extract comprising fibres:
Exactly 2 g of sample were weighed into a tube. 38 ml of demineralized water were then added.

The case of a wet pea extract comprising fibres:
Exactly 2 g of solids of sample were weighed out (calculate the mass of sample to be weighed out–the mass depends on the solids content of the sample). The amount of water sufficient to obtain a final mass of water of 38 ml was then added (calculate the mass of water already present in the sample and add the remainder to reach 38 ml).

The remainder of the protocol is identical, whatever the sample.

The sample was stirred for 5 seconds and left to swell for 18 h. The medium was then centrifuged at 1820 G for 10 minutes and again left to swell for 10 minutes. The supernatant was then discharged and the tube containing the pellet (P2) was weighed.

$$RE(\text{in g of water/g of sample}) = (\text{mass of water retained})/(\text{mass of solids of the sample})$$

$$RE = (\text{mass of pellet}(g) - (\text{mass of sample}(g) \times \% \text{ solids content}/100)/(\text{mass of sample}(g) \times \% \text{ solids content}/100)$$

$$RE = ((P2 - P1) - (m \times \text{solids content}/100))/(m \times \text{solids content}/100)$$

P1: Tare of the tube (g); P2: Mass tare+pellet (g); m: mass of pea extract containing fibres (g).

Determination of the Particle Size by the Dry Process

The objective was to determine the size of the particles constituting a powdered sample.

The sieves used were the following: 1000 µm, 500 µm, 400 µm, 315 µm, 200 µm, 100 µm (pore sizes).

First of all, the clean and dry sieves were weighed and stacked in increasing order of pore size. 50 g of powder to be analyzed were weighed out and then placed on the upper sieve. The pea extract comprising fibres was sieved for 20 minutes at an intensity of 1.5. After the analysis, each sieve was weighed, as was the bottom container with the powder that it contains. It was possible to adjust the number and the size of the sieves as required.

$$\% \text{ of powder(for a given particle size)} = ((\text{Total weight} - \text{tare})/\text{Sample weight}) \times 100$$

Determination of the Particle Size Via the Wet Process

The objective was to determine the size of the particles constituting a wet sample.

The sample passes through various sieves by washing and the amount of material and of the solids of each fraction is determined in order to establish the particle size profile.

The sieves used are the following: 50 µm, 100 µm, 200 µm, 315 µm, 400 µm, 500 µm (pore size).

The solids content of the starting sample is measured. Each sieve was tared. The sieves are then assembled, from the finest at the bottom, to the coarsest at the top. A 5 l beaker was then tared and placed under the sieve assembly. Precisely 1 kg of sample was weighed out. The sample was poured onto the coarsest sieve and passed through it by "massaging" the sieve by hand (wear gloves). Water was added to the first sieve (500 µm) until it was filled. The first sieve was then manually massaged in order to allow the particles smaller than 500 µm to pass through. The 500 µm sieve was then removed. The next sieve (400 µm) was then massaged in order to allow the particles smaller than 400 µm to pass through. The 400 µm sieve was then removed. The same operations were carried out with the 315 µm, 200 µm, 100 µm and 50 µm sieves. All these steps were repeated until 5 l of liquid were recovered in the beaker.

When the washing was finished, the amount of sample recovered on each sieve was weighed.

The solids content of each fraction recovered on each sieve was measured.

The results are expressed in the following way:

$$m \text{ sample sieve} X = m(\text{sieve} X + \text{sample sieve} X) - m \text{ sieve} X$$

$$m \text{ solids of sample sieve} X = m \text{ sample sieve} X \times \text{solids of sample sieve} X / 100\%$$

$$\text{sample for sieve} X = (m \text{ solids of sample sieve} X) / \Sigma(m \text{ solids of sample of all the sieves})$$

Measurement of the pH on Dry Peas or on an Aqueous Composition Comprising Peas or on an Aqueous Composition Comprising Ground Peas The pH was measured at ambient temperature using a WTW Series Inolab Terminal 740 pH-meter. The apparatus was calibrated using buffering solutions at pH 4.01 (WTW technical buffer pH 4.01, model STP4, order n° 108706) and at pH 7 (WTW technical buffer pH 7.00, model STP7, order n° 108708).

pH on Whole Peas

When the pH was measured on peas, the peas were taken from the hydration tank. The peas were strained in a strainer and then deposited on an absorbent paper for 2 minutes in order to remove the excess juice. The peas were ground for 1 minute using a mixer (Magic Bullet, Homeland Housewares). 1 g of the ground peas were suspended in 9 g of deionized water (water conductivity<15 µS). The suspension was again ground using the mixer. Finally, the pH of the suspension was measured at ambient temperature once the value had stabilized.

pH on an Aqueous Composition Comprising Peas

When the pH was measured on the aqueous composition free of peas, a sample of aqueous solution was taken directly from the hydration tank. The pH of the sample was measured once the value had stabilized.

pH on an Aqueous Composition Comprising Ground Peas

When the pH was measured on an aqueous composition comprising peas, it was measured directly in the tank once the value had stabilized.

Counting of Lactic Acid Bacteria

Dilutions of the samples were carried out with Led Techno 9 ml EPT Dilucups.

The medium used was MRS agar (according to De Man, Rogosa and Sharpe) sold by Merck, Cat. n° 1.10661.0500.

The peas or the pea suspension were ground using a Homeland Housewares Magic Bullet grinder.

During the analysis of a sample of the aqueous composition free of peas, a sample was taken directly from the fermentation tank. 1 ml of sample was plated out. When a dilution proved to be necessary, 1 ml of sample was added to the diluting cup and this step was repeated until the correct dilution was obtained, then 1 ml of diluted sample was plated out. The Petri dishes were incubated for 48 hours at 45° C.

During the analysis of a pea sample, shelled peas were taken from the fermentation tank. The peas were strained in a strainer and then deposited on an absorbent paper for 2 minutes in order to remove the excess juice. The peas were ground for 1 min. The ground peas were suspended (1 g of peas in 9 g of deionized water) in deionized water (conductivity<15 µS). The suspension was then ground using the mixer. 1 ml of suspension was plated out. When a dilution proved to be necessary, 1 ml of suspension was added to the diluting cup and this step was repeated until the correct dilution was obtained, then 1 ml of diluted sample was plated out. The Petri dishes were incubated for 48 hours at 45° C.

Measurement of Acidity

The acidity was measured using a WTW Series Inolab Terminal 740 pH-meter. The apparatus was calibrated using buffering solutions at pH 4.01 (WTW technical buffer pH 4.01, model STP4, order n° 108706) and at pH 7 (WTW technical buffer pH 7.00, model STP7, order n° 108708).

The peas or the pea suspension were ground using a Homeland Housewares Magic Bullet mixer.

During the measurement of the acidity of the "pea juice", a sample (A) was taken directly from the fermentation tank. The sample (A) was weighed. A solution of sodium hydroxide at 1 mol/l (C) (n° 1.09137.1000 TitriPURR; density=d=1.04 kg/l) was slowly added until the pH of the sample was stabilized at pH 7 for at least 2 minutes. The mass of sodium hydroxide (B) was then calculated.

$$\text{Acidity(mEq/kg)} = (B \times (C/d)/A) \times 1000$$

During the measurement of the acidity of the peas, shelled peas were taken from the fermentation tank. The peas were strained in a strainer and then deposited on an absorbent paper for 2 minutes in order to remove the excess juice. The peas were ground for 1 min. The ground peas were suspended (1 g of peas in 9 g of deionized water) in deionized water (conductivity<15 µS). The suspension was then ground using the mixer. A pea suspension was obtained.

The exact amount of the pea suspension (A') was weighed. A solution of sodium hydroxide at 1 mol/l (C') (n° 1.09137.1000 TitriPURR; density=d=1.04 kg/l) was slowly added until the pH of the suspension was stabilized at pH 7 for at least 2 minutes. The mass of sodium hydroxide (B') was then calculated.

$$\text{Acidity(mEq/kg)} = (B' \times (C'/d)/(A'/10)) \times 1000$$

Measurement of the Oil Retention (RH)

10 g of pea extract comprising fibres, after drying, were weighed out and dispersed in 80 g of sunflower oil. The whole mixture (P0) was left to absorb for 15 minutes with magnetic stirring (position 10). Two centrifuge tubes (pre-tared) were filled up to 2.5 cm from the edge (stir for 1 minute between the two tubes). The assembly (tube+dispersion) was weighed (temper the tubes if necessary). The tubes were centrifuged (table centrifuge–MKII/ALC 4217) for minutes at 3000 rpm. The assembly was left to stand for 8 minutes. The supernatant was transferred and weighed (P1).

$$RH = (\text{in g of oil/g of fibres}) = (\text{mass oil retained})/(\text{mass sample})$$

$$RH = (\text{mass pellet(g)} - \text{mass sample(g)})/(\text{mass sample (g)})$$

$$RH = ((P0 - P1 - (P0/9))/(P0/9)$$

With P0: mass sample+oil, P1: mass of the supernatant

Fibre Analysis

Pectin

The pectins were quantified using the method described in Food Chemistry 96 (2006), 477-484 "Kinetic of the hydrolysis of pectin galacturonic acid chains and quantification by ionic chromatography", Garna H. et al.

The method uses 2M trifluoroacetic acid (TFA).

Cellulose and Hemicellulose

The cellulose and hemicellulose were assayed by the method of Englyst; FIE Chromatography, 3; Ingredients analysis "Measurement of dietary fibre" p 84-93. In the Englyst procedure, the starch is completely removed enzymatically and the non-starchy polysaccharides are measured as equal to the sum of its constituent sugars released by acid hydrolysis. The sugars can be measured by liquid chromatography, giving values for the individual monosaccharides, or more rapidly by calorimetry.

Lignin

The soluble and insoluble lignins were assayed. The insoluble lignin was assayed according to the TAPPI T 222 om-11 method. The sugars were hydrolyzed and dissolved with sulphuric acid. The acid insoluble lignin was filtered off, dried and weighed.

The soluble lignin was assayed by another method. The residue remaining after acid hydrolysis of the biomass sample. corrected for the ash content, was denoted as the lignin insoluble in the acid. This value, however, does not represent the total content of the lignin of the sample. A small part of the lignin is dissolved during the hydrolysis procedure and can be quantified by ultraviolet spectroscopy.

After the samples had been hydrolyzed according to the TAPPI T 222 om-11 method. the hydrolysates were filtered and the filtrate was analyzed by spectrophotometry at a wavelength of 205 nm in quartz cuvettes. The samples were diluted so as to obtain an absorbance of between 0.2 and 0.7.

Calculation

The formula is the following=

Acid soluble lignin(g/l)=$(A/(b \times a)) \times df$

With A: Absorbance at 205 nm
df: dilution factor
b: length of the cell
a: absorption, equal to 110 l/g-cm Measurement of the Gel Strength The gel strength was determined by measuring the maximum resistance of a gel to a compression applied by a probe directed by a texture analyzer. The fibre gel is formed from a suspension of fibres which has been subjected to heat treatment followed by cooling.

The rigidity of the gel is expressed either in g or in N. The method was used for a powder of pea extract comprising fibres with a solids content of 85% to 90% (based on weight). The measurement was carried out at ambient temperature.

1456.9 g of Milli-Q water was weighed, at a temperature of 20° C., into the bowl of a mixer (Kenwood major). 243.1 g of pea extract comprising fibres were weighed (Ohaus ARC120 balance, sensitivity 0.01 g, capacity 3100 g) into a beaker and poured onto the surface of the water. The mixture was mixed for 90 seconds on speed 1. The edges of the bowl were scraped. The mixture was again mixed for 90 seconds on speed 1. The small bottle (pre-tared; diameter 73 mm, height: 44 mm, capacity 150 ml, weight 30.1 g) was filled with a spoon while regularly tapping. The tapped small bottle must contain 145 g of mixture. The small bottle was crimped with a Sertinox device and placed in a water bath at 75° C. for 50 minutes. The small bottle was removed from the water bath, dried and placed in a refrigerator at 4° C. overnight.

The gel strength was measured on a TA XT2i 15 texture analyzer (Stable Micro Systems, Ltd.) with a compression load cell of 5 kg and a conical probe (P45C Perspex 45° cone). The gel strength is the maximum force recorded at the end of the penetration, expressed in g.

TA-XT2i parameters:
  Measurement of the compressive force–maintenance of the force for 30 s
  Speed before the test: 2.0 mm/s
  Speed during the test: 1.0 mm/s
  Speed after the test: 5.0 mm/s
  Penetration distance: 20.0 mm
  Time: 30.00 s
  Contact pressure/surface: Auto–1.0 g Measurement of the Hardness of Nuggets The hardness of nuggets before cooking is defined as the force required to compress a nugget over a distance of 35 mm.

The measurement was carried out using a TA-XT2i texture analyzer.

Apparatus:
  TA-XT2i texture analyzer (Stable Micro Systems, Ltd)
  Compression cell load, 25 kg
  Probe P45C 45° perspex cone Procedure:
  TA-XT2i parameters:
    Measurement of compressive force
    Speed before the test: 2 mm/s
    Speed during the test: 1 mm/s
    Speed after the test: 1 mm/s
    Penetration distance: 35 mm
    Temperature: 0° C.
    Contact pressure/surface: Auto–1.0 g The results are recorded by the analyzer and transcribed onto a graph.

The hardness of the nugget is the maximum force recorded during the test (expressed as "maximum force"). The results of the tests were obtained from 20 samples and the average value was calculated.

Measurement of Colour

The coordinates L*a*b* were measured at 20° C. using a CR5 chromameter (Konica Minolta TA Sensing, Europe). L* denotes the luminosity on a scale of 0 to 100 from black to white; a*, (+) red or (−) green; and b*, (+) yellow or (−) blue.

Sample Preparation

The Petri dish was filled with the sample in order for the analysis to be carried out on a uniform surface. The Petri dish was placed on the apparatus at the specifically reserved place and the analysis began.

RESULTS

The L*a*b* values are indicated by the chromameter (average of three measurements).

Example 1: Process for Preparing a Pea Extract Comprising Fibres According to One Embodiment of the Present Invention This example was carried out according to the protocol represented diagrammatically in FIG. 1.

The dry harvested peas, herein denoted "dry peas" (having a solids content (on the basis of the total weight of the dry peas) of about 87%) were sieved and the stones were removed therefrom by passing through a stone remover. The peas were then shelled in a shelling machine.

The peas were then brought into contact with an aqueous solution (solution of drinking water) and subjected to hydration. 400 kg of peas per m³ of the total volume of aqueous composition comprising peas were placed in a tank. The hydration was carried out in a closed tank without degassing at a temperature of about 40° C. At the same time, the peas were subjected to a fermentation with lactic acid bacteria. The peas were subjected to a fermentation in the presence of about $10^8$ cfu of lactic acid bacteria per ml of aqueous composition comprising peas. The fermentation was carried out until a pH of the peas of 4.4 was obtained. During the fermentation, the aqueous phase in the fermentation tank was recycled at about 20 m³/h. The peas were fermented for a period of 480 min. At the end of the fermentation, the peas had absorbed an amount of water equal to about their initial mass before being fermented and had a solids content of about 43% (by weight).

After fermentation, the peas were removed from the aqueous solution. The peas were then placed in a perforated rotary drum and washed in order to remove the remaining soluble impurities. After cleaning, the peas were subjected to wet grinding. During the grinding, additional drinking water was added so that the final composition had a solids content of about 25% (by weight). During the grinding step, the pH was adjusted to about 8 by adding sodium hydroxide.

After grinding and adjustment of the pH, the paste of ground peas was subjected to settling out by centrifugation. The pellet containing fibres and starch had a solids content of about 45% (by weight). The fibre-enriched fraction was diluted to a solids content of 20% (by weight). The fibre-enriched fraction was then sieved in order to remove a part of the starch. The pea extract comprising fibres had a solids content of about 10% (by weight).

Next, the pea extract comprising fibres was passed through a press in order to remove a part of the water from the medium. The pea extract comprising fibres then has a solids content of about 30% (by weight).

Finally, the pressed pea extract comprising fibres was dried on a flash drier with recirculation of the dried product. The input temperature of the flash drier was about 200° C. and the output temperature was about 75° C.

Figure 2:
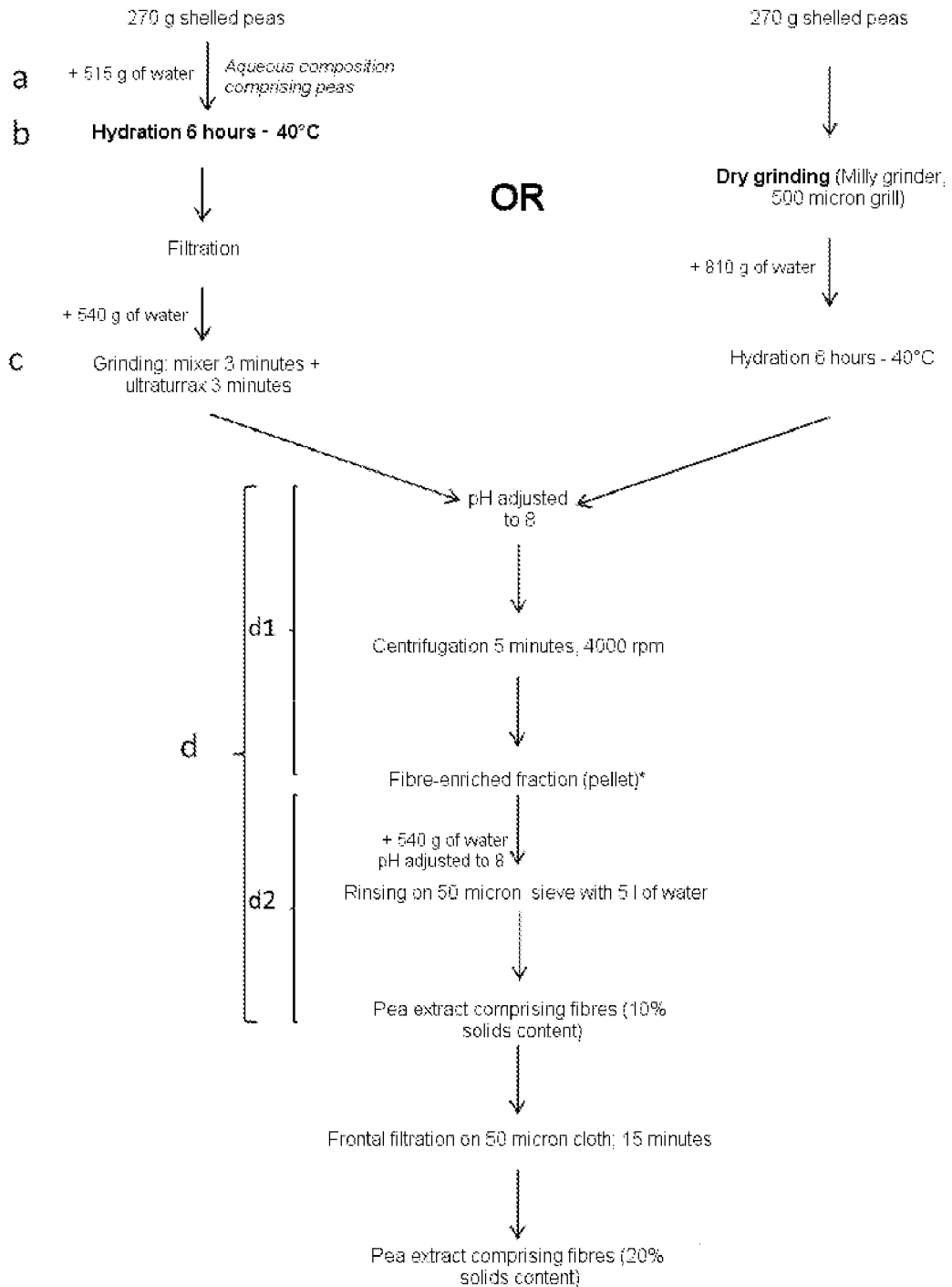
FIG. 2 represents diagrammatically an extraction process according to the embodiment of example 2.

Example 2: Comparison Between Grinding of Hydrated Pea and Grinding of Dry Pea The protocol is described in FIG. 2. Various parameters were also measured and are presented in table 2 below (SC: solids content)

TABLE 2

| Pea extract | Grinding of hydrated pea | Grinding of dry pea |
| --- | --- | --- |
| SC (%) | 23.3 | 28.8 |
| Starch (% SC) | 54.5 | 47.6 |
| Ash (% SC) | 1.4 | 1.3 |
| RE (g/g SC) | 13.0 | 8.1 |

Example 3: Effect of the Hydration Time on the Shelled Pea at 40° C.

Figure 3:
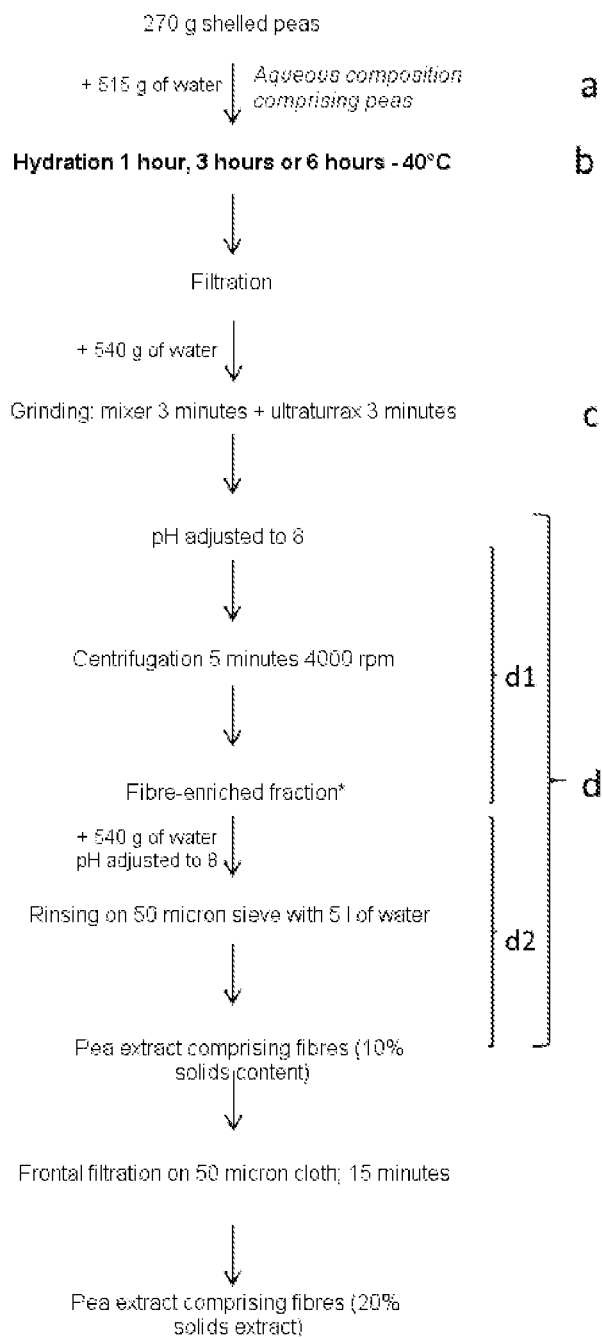
FIG. 3 represents diagrammatically an extraction process according to the embodiment of example 3.

The protocol followed is described in FIG. 3. The results are presented in table 3 below.

TABLE 3

| Hydration time | SC (%) | Starch (%/SC) | Ash (% SC) | RE (g/g SC) |
| --- | --- | --- | --- | --- |
| 1 hour | 23.2 | 44.8 | 1.6 | 12.5 |
| 3 hours | 23.0 | 51.4 | 1.3 | 12.5 |
| 6 hours | 23.3 | 55.7 | 1.3 | 13.0 |

Example 4: Effect of Shelling Before or After Hydration for 6 hours at 20° C.

Figure 4:
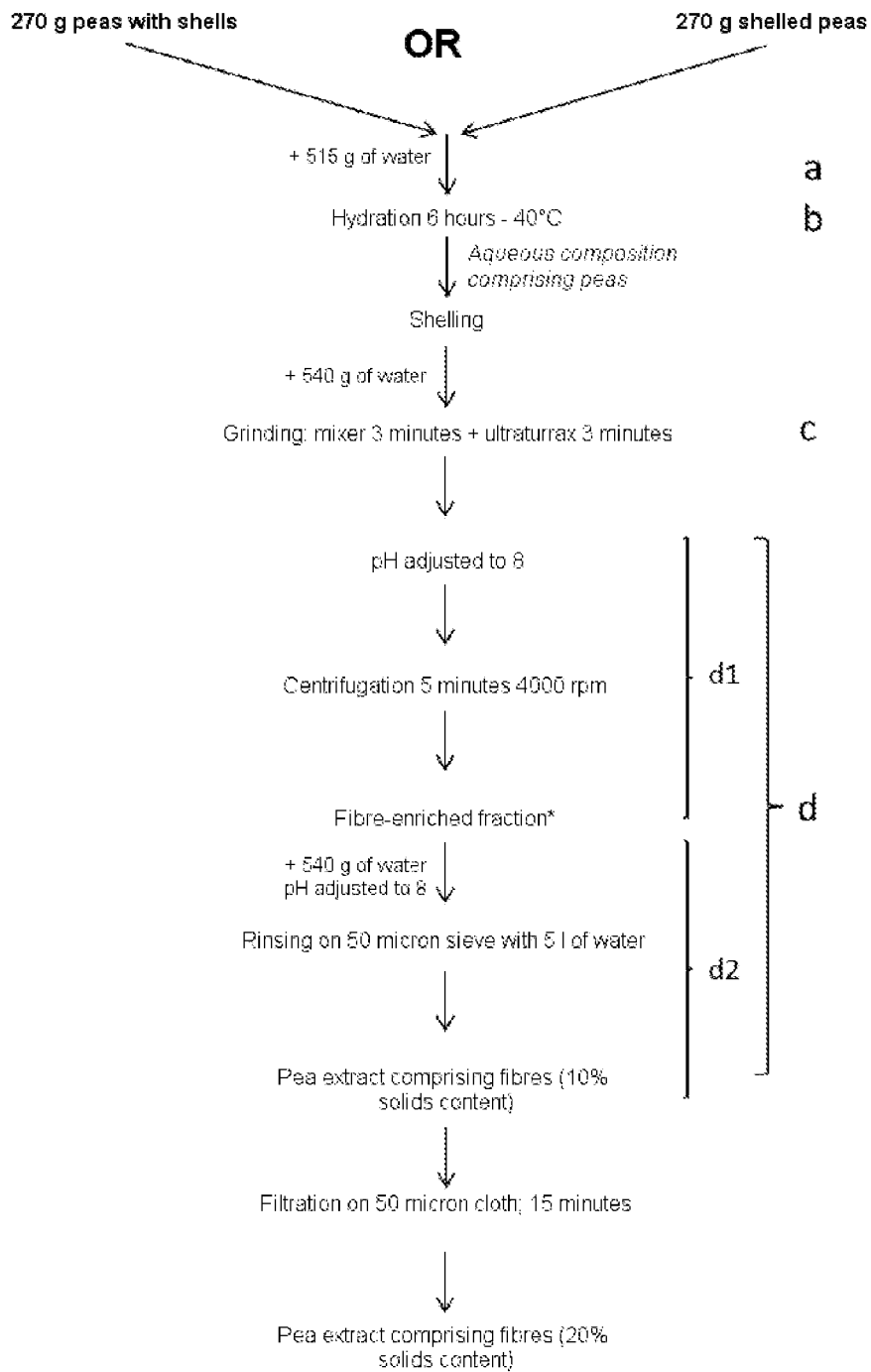
FIG. 4 represents diagrammatically an extraction process according to the embodiment of example 4.

The protocol followed is described in FIG. 4. The results are presented in table 4 below.

TABLE 4

| | SC (%) | Starch (%/SC) | Ash (% SC) | RE (g/g SC) |
| --- | --- | --- | --- | --- |
| Shelled peas | 22.0 | 54.9 | 1.4 | 12.9 |
| Non-shelled peas | 23.3 | 53.5 | 1.5 | 12.4 |

Example 5: Food Products Comprising a Pea Extract Comprising Fibres According to the Invention The inclusion of the pea extract comprising fibres in various food products was evaluated.

1. Burger Recipe

The pea extract comprising fibres that was obtained in example 1 was used in this example.

The ingredients of the recipe are described in table 5 below. A control recipe was carried out, i.e. without the pea extract comprising fibres.

TABLE 5

| Ingredients | Beef burger (g) | Control (g) |
| --- | --- | --- |
| Beef meat (15% fat) | 80.20 | 82.00 |
| Water | 15.00 | 15.00 |
| Pea extract comprising fibres | 1.80 | |
| Salt | 1.50 | 1.50 |
| Dextrose/Lactose | 0.80 | 0.80 |
| Seasoning | 0.65 | 0.65 |
| Ascorbic acid | 0.05 | 0.05 |
| TOTAL | 100 | 100 |

The fresh meat was stored in a cold room at 0° C. for 12 hours before use. The meat was then pre-ground with a plate having pores 5 mm in diameter. The water was then poured onto the meat in the blade mixer. The pea extract comprising fibres was added to the minced meat in the blade mixer and mixed for 3 minutes. The other ingredients were then added and the whole mixture was mixed for 6 minutes and then cooled to 2° C. The preparation was then ground for 5 minutes. Desired pea burgers were formed and frozen at −18° C. The burgers were then grilled at 125° C. for 4 minutes on each side.

With the use of the pea extract comprising fibres, during the preparation, the paste was non-tacky and easy to handle and to shape. The burgers behaved well upon cooking, with reduced losses upon cooking. The shrinkage was controlled during cooking. The cooked burgers had a good texture and a juicy sensation in the mouth. The colour and the taste of the meat were preserved.

Table 6 presents the various characteristics of the burgers with and without pea extract comprising fibres.

TABLE 6

| | Beef burger comprising the pea extract comprising fibres | Control |
| --- | --- | --- |
| Shrinkage in length | −16% | −22% |
| Shrinkage in width | −15% | −22% |
| Total loss upon cooking | −10.9% | −22.2% |
| Texture after cooking | Good | Firm |
| Juiciness after cooking | Good | Dry |
| Taste after cooking | Ok | Ok |

The burgers were measured according to their width (W1 and W2) and their length (L1 and L2) before (1) and after (2) cooking.

The percentage shrinkage in length is equal to: ((L2−L1)/L1)×100.

The percentage shrinkage in width is equal to: ((W2−W1)/W1)×100.

The burgers were weighed before (m1) and after (m2) cooking. The total loss upon cooking is equal to: ((m2−m1)/m1)×100.

The texture, the juiciness and the taste after cooking were analyzed by sensory analysis according to standard V 09-001.

The texture was defined as being the sensation of firmness during chewing. The juiciness was defined as being the release of juice during chewing. The taste was defined as being an absence of unusual and inappropriate taste.

2. Nugget Recipe

The pea extract comprising fibres that was obtained in example 1 was used in this example.

The ingredients of the recipe are described in table 7 below. A control recipe was carried out, i.e. without pea extract comprising fibres.

TABLE 7

| Ingredients | Poultry nuggets (g) | Control (g) |
|---|---|---|
| Chicken breast (25 mm plate) | 40.00 | 42.20 |
| Chicken breast (4 mm plate) | 10.00 | 10.00 |
| Turkey thigh (4 mm plate) | 15.00 | 15.00 |
| Chicken skin | 5.00 | 5.00 |
| Ice-cold water | 25.50 | 25.50 |
| Pea extract comprising fibres | 2.20 | |
| Salt | 1.20 | 1.20 |
| Dextrose | 0.50 | 0.50 |
| Sodium tripolyphosphate (E 451, 452) | 0.35 | 0.35 |
| Seasoning (pepper, garlic, nutmeg) | 0.25 | 0.25 |
| TOTAL | 100 | 100 |

First of all, the brine was prepared by dissolving the phosphate and the salt in ice-cold water. Everything was mixed until complete dissolution. The dextrose and the seasoning were then added. The chicken breasts (about 4/5) were ground through a 25 mm plate and the rest through a 4 mm plate. The turkey thigh was ground through a 4 mm plate. The meat was loaded into a churn and the pea extract comprising fibres and the brine were added simultaneously. The preparation was churned under vacuum (−0.9 bar) for 20 minutes (20 revolutions per minute for 8 minutes (continuous) and 2 minutes pause). The whole mixture was refrigerated at −2° C. The nuggets were formed and coated with breadcrumbs and then fried for 45 seconds at 180° C. (pre-frying). The nuggets were then frozen and packaged. The nuggets were then fried in a fryer (comprising vegetable oil) at 180° C. for 6 minutes (complete frying).

During the preparation, the nuggets behaved well upon cooking, with reduced losses upon cooking. The paste has an excellent texture before cooking and is non-tacky and easy to handle and to shape. The product is very stable after freezing/thawing. It has a juicy texture in the mouth. There was no effect on the colour of the product and the taste of the poultry was preserved.

Table 8 presents the various characteristics of the nuggets with and without pea extract comprising fibres.

TABLE 8

| | Poultry nuggets | Control |
|---|---|---|
| Hardness before cooking | 380 | 236 |
| Loss upon cooking after pre-frying | −2.4% | −8.0% |
| Loss upon cooking after complete frying | −13.6% | −29.3% |
| Total losses upon cooking | −15.7% | −35.0% |
| Texture after cooking | Good | Ok |
| Juiciness after cooking | Good | Too dry, juice is lost |
| Taste after cooking | Ok | Ok |

The nuggets were weighed before (m1) and after (m2) cooking. The total loss upon cooking is equal to: ((m2−m1)/m1)×100.

The texture, the juiciness and the taste after cooking were analyzed by sensory analysis according to standard V 09-001.

The texture was defined as being the sensation of firmness during chewing. The juiciness was defined as being the release of juice during chewing. The taste was defined as being an absence of unusual and inappropriate taste.

Example 6: Food Products Comprising a Pea Extract Comprising Fibres According to the Invention, the Extract Having Undergone a Second Grinding After Drying The pea extracts comprising fibres that were obtained in example 1 were used in this example. The pea extract comprising fibres was dry-ground a second time with a pin grinder (d50=65 μm, d90=180 μm, the particle size was measured by sieving via the dry process), then mixed with a composition so as to form a brine. The ingredients of the brine are described in table 9 below.

TABLE 9

| | Brine comprising the pea extract comprising fibres, ground a 2nd time | Brine comprising the pea extract comprising fibres |
|---|---|---|
| Water | 88.95% | 88.95% |
| Sodium phosphate | 1.73% | 1.73% |
| Salting salt | 5.76% | 5.76% |
| Dextrose | 1.39% | 1.39% |
| K-carragheenan | 0.30% | 0.30% |
| Sodium ascorbate | 0.13% | 0.13% |
| Pea extract comprising fibres | 1.73% | 1.73% |
| Total | 100% | 100% |

The brine was prepared by dispersing the sodium phosphate in cold water. The nitrited salt and then the dextrose are then dissolved. The pea extract comprising fibres was added to the mixture. The k-carragheenan was then dispersed and the sodium ascorbate was dissolved.

The brine was injected into the defatted fresh meat (piece of ham of about 5 kg) until the desired yield of 40% was achieved. The injector used is the Gunther −54 needles, 4 mm.

The meat with the brine was then massaged for 15 minutes (6 rpm continuously). The meat was placed in a plastic bag and cooked in hot water at 82° C. (inner temperature 72° C.). The meat was then refrigerated at 4° C.

Table 10 presents the various characteristics of the meats with pea extract.

TABLE 10

|  | Meat containing the pea extract comprising fibres, ground a 2nd time | Meat containing the pea extract comprising fibres |
| --- | --- | --- |
| Observations during the preparation of the brine | OK | OK |
| Observation/filter | No residue | Large cake at the surface of the filter |
| Observations in the machine | OK | Stop |

Example 7: Comparison of the Pea Extract Comprising Fibres After Drying with Pea Extracts of the Prior Art Various pea extracts were tested and compared with the pea extracts according to the invention. The results are shown in table 11.

TABLE 11

| Characteristics | Pea extract comprising fibres | Pea extract comprising fibres | Pea extract comprising fibres | Pea extract comprising fibres having undergone a 2nd grinding | Emfibre EF 150 | Pea fibre I50M |
| --- | --- | --- | --- | --- | --- | --- |
| Supplier | According to the invention | According to the invention | According to the invention | According to the invention | Emsland | Roquette |
| Fibre content (%/SC) | | | | | | |
| Fibres/starch ratio | | | | | | |
| Colour | white | white | white | white | yellowish | yellowish |
| Taste | neutral | neutral | neutral | neutral | neutral | neutral |
| D50 Particle size | <300 μm | <300 μm | <300 μm | <300 μm | <300 μm | <300 μm |
| Water retention (g of water/g of solids) | 12.4 | 16.6 | 13.5 | 9.6 | 10.3 | 5.3 |
| Oil retention (g of oil/g of solids) | 3.3 | | 3.6 | 2.1 | 2.1 | 1.6 |
| Gel strength after heat treatment (g) | 497 | | 531 | 402 | 325 | 92 |
| Protein content % by weight relative to solids | 4.00 | | 4.1 | 4.1 | 12.7 | 8.2 |
| % solids content | 89.9 | 95.5 | 90.9 | 90.9 | 91.2 | 93.2 |

The invention claimed is:

1. Ground pea extract comprising particles, said particles comprising fibres,
    wherein the ground pea extract has a solids content of at least 80% and of at most 95% on the basis of the total weight of the extract;
    wherein the fibres are present in an amount of at least 35% and of at most 80% by weight on the basis of the solids, assayed by the AOAC-985.29 method;
    wherein the particles of the ground pea extract have a particle size D50<200 μm, measured by dry particle size analysis; and
    wherein the ground pea extract has a water retention of at least 7 g of water/g of solids.

2. Ground pea extract according to claim 1, wherein the particles of the ground pea extract have a particle size D50<100 μm, measured by dry particle size analysis.

3. Ground pea extract according to claim 1, wherein the particles of the ground pea extract have a particle size D90<400 μm, measured by dry particle size analysis.

4. Ground pea extract according to claim 1, wherein the particles of the ground pea extract have a particle size D90<300 μm, measured by dry particle size analysis.

5. Ground pea extract according to claim 1, wherein the ground pea extract comprises a protein content of less than 5% on the basis of the solid.

6. Ground pea extract according to claim 1, wherein the ground pea extract is further characterized in that it has
    an oil retention of at least 1.5 g of oil/g of solids and of at most 5.0 g of oil/g of solids; and
    a gel strength after heat treatment of at least 250 g and of at most 900 g.

7. Ground pea extract according to claim 1, wherein the fibres/starch ratio is at least 40/60.

8. Ground pea extract according to claim 1, wherein the ground pea extract has a gel strength after heat treatment of at least 300 and of at most 400 g.

9. Edible composition comprising the ground pea extract according to claim 1.

10. The edible composition according to claim 9, which is selected from the group consisting of a restructured product which is a meat-based, poultry-based, fish-based or a vegetable-based product, pork, chicken and/or fish fresh sausage or sausage eaten cold in slices and meat-, fish- or vegetarian-based pâté.

* * * * *